United States Patent
Tsukagoshi et al.

(10) Patent No.: US 8,551,652 B2
(45) Date of Patent: Oct. 8, 2013

(54) ELECTRICITY STORAGE MATERIAL AND ELECTRICITY STORAGE DEVICE

(75) Inventors: Takafumi Tsukagoshi, Osaka (JP); Nobuhiko Hojo, Osaka (JP); Yu Ohtsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 332 days.

(21) Appl. No.: 12/865,318

(22) PCT Filed: Jun. 25, 2009

(86) PCT No.: PCT/JP2009/002932
§ 371 (c)(1),
(2), (4) Date: Jul. 29, 2010

(87) PCT Pub. No.: WO2009/157206
PCT Pub. Date: Dec. 30, 2009

(65) Prior Publication Data
US 2011/0003201 A1   Jan. 6, 2011

(30) Foreign Application Priority Data

Jun. 25, 2008 (JP) ................ 2008-166404
Dec. 2, 2008 (JP) ................ 2008-307610

(51) Int. Cl.
*H01M 4/13* (2010.01)

(52) U.S. Cl.
USPC ........................................................ 429/213

(58) Field of Classification Search
USPC ........................................................ 429/213
See application file for complete search history.

(56) References Cited

U.S. PATENT DOCUMENTS

| | | |
|---|---|---|
| 2004/0045818 A1 | 3/2004 | Inatomi et al. |
| 2004/0214082 A1 | 10/2004 | Inatomi et al. |

(Continued)

FOREIGN PATENT DOCUMENTS

| | | |
|---|---|---|
| JP | 01-172382 | 7/1989 |
| JP | 2004-111374 | 4/2004 |

(Continued)

OTHER PUBLICATIONS

English machine Translation of JP2007-305461A.*

(Continued)

*Primary Examiner* — Patrick Ryan
*Assistant Examiner* — Lucas J O'Donnell
(74) *Attorney, Agent, or Firm* — McDermott Will & Emery LLP

(57) ABSTRACT

An electricity storage material according to the present invention contains a copolymer compound of first units and second units, each first unit having a side chain which is an oxidation-reduction site having a π conjugate electron cloud and being of a structure represented by general formula (1) below, and each second unit having no oxidation-reduction reaction site as a side chain. In general formula (1), $X_1$ to $X_4$ are, independently, a sulfur atom, an oxygen atom, a selenium atom, or a tellurium atom; $R_1$ and $R_2$ are, independently, an acyclic or cyclic aliphatic group including at least one kind selected from the group consisting of a carbon atom, an oxygen atom, a nitrogen atom, a sulfur atom, a silicon atom, a phosphorus atom, and a boron atom, each including at least one or more double bonds; and one of $R_1$ and $R_2$ includes a bonding hand for binding to another portion which is a main chain or a side chain of the copolymer compound.

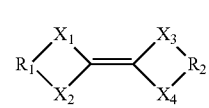

(1)

9 Claims, 3 Drawing Sheets

(56) References Cited

U.S. PATENT DOCUMENTS

2006/0289058 A1* 12/2006 Skabara et al. ............. 136/263
2009/0094822 A1* 4/2009 Ohtsuka et al. ............. 29/623.1
2010/0099815 A1* 4/2010 Rinzler et al. ............. 524/560

FOREIGN PATENT DOCUMENTS

| | | |
|---|---|---|
| JP | 2004-342605 | 12/2004 |
| JP | 2007-281107 | 10/2007 |
| JP | 2007-305461 | 11/2007 |
| JP | 2008-192411 | 8/2008 |
| WO | WO 2007/116926 A1 | 10/2007 |
| WO | WO 2007116926 A1 * | 10/2007 |

OTHER PUBLICATIONS

Yamada, J, et al., "TTF Chemistry, Fundamentals and Applications of Tetrathiafulvalene", 2004, Kodansha Springer.

* cited by examiner

ELECTRICITY STORAGE MATERIAL AND ELECTRICITY STORAGE DEVICE

RELATED APPLICATIONS

This application is the U.S. National Phase under 35 U.S.C. §371 of International Application No. PCT/JP2009/002932, filed on Jun. 25, 2009, which in turn claims the benefit of Japanese Application No. 2008-166404, filed on Jun. 25, 2008 and Japanese Application No. 2008-307610, filed Dec. 2, 2008, the disclosures of which Applications are incorporated by reference herein.

TECHNICAL FIELD

The present invention relates to an electricity storage material and an electricity storage device in which the same is used.

BACKGROUND ART

In recent years, portable electronic devices such as portable audio devices, mobile phones, and laptop computers are widely prevalent, and various secondary batteries are being used as power supplies of such portable electronic devices. Moreover, there are much greater needs for large-capacity secondary batteries than for portable electronic devices. For example, from an energy saving standpoint, or from a standpoint of reducing the discharged amount of carbon dioxide, among automobiles incorporating conventional internal combustion engines, hybrid vehicles are gaining prevalence in which an electricity-based driving force is also utilized. Therefore, regardless of the purpose, secondary batteries having improved characteristics, e.g., output power, capacity, cyclic characteristics, are needed.

Since a secondary battery stores electric charge through an oxidation-reduction reaction, the aforementioned characteristics of the secondary battery are greatly affected by a substance which reversibly undergoes oxidation-reduction reactions, i.e., an electricity storage material which stores electric charge. In conventional secondary batteries, metals, carbon, inorganic compounds, and the like have been used as electricity storage materials. For example, in the case of lithium secondary batteries which are currently in wide use, metal oxide, graphite, and the like have been used as a positive-electrode active substance and a negative-electrode active substance, which are electricity storage materials.

Instead of these inorganic materials, organic compounds are being studied for use as electricity storage materials. As compared to inorganic compounds, organic compounds have established synthesis methods, thus making it relatively easy to synthesize compounds having new molecular structures as designed. Therefore, it is considered that using organic compounds as active substances makes it possible to realize active substance with various characteristics based on molecular designs.

Moreover, since organic compounds are lighter in weight than metals, a light-weight secondary battery can be realized when a secondary battery is constructed by using electricity storage materials composed of organic compounds. Therefore, for example, they can be considered as suitable for secondary batteries of hybrid vehicles, which do not need to have a high charge density but are required to be light-weighted. Use of capacitors as electricity storage devices for hybrid vehicles is also under study. The above advantages will also be available when electricity storage materials composed of organic compounds are used for a capacitor that utilizes chemical reactions.

In Patent Documents 1 and 2, the inventors of the present invention have proposed an organic compound having a $\pi$ electron conjugated cloud, as a new electricity storage material which is expected to realize rapid charging and discharging, and revealed its reaction mechanism.

Such an organic compound having a $\pi$ electron conjugated cloud can be synthesized either as a low-molecular-weight compound or as a polymer compound. In the case where an organic compound having a $\pi$ electron conjugated cloud is used for an electricity storage device such as a secondary battery, since a nonaqueous solvent is used as an electrolyte solution, it is preferable to use an organic compound having a $\pi$ electron conjugated cloud in the form of a polymer compound, in order to suppress elution into the electrolyte solution and improve the characteristics of the electricity storage device.

In Patent Document 3, the inventors of the present invention have proposed using, for an electricity storage device, a polymer compound which includes a plurality of organic compound sites having a $\pi$ electron conjugated cloud. For example, they have disclosed a polymer compound which is obtained by allowing an organic compound site having $\pi$ electron conjugated cloud to bind to a polymer compound having a polyacetylene or polymethylmethacrylate chain as a main chain. Moreover, they have disclosed a polymer compound which is obtained through a dehydration condensation of a side chain having carboxytetrathiafulvalene onto a main chain of polyvinyl alcohol.

CITATION LIST

Patent Literature

[Patent Document 1] Japanese Laid-Open Patent Publication No. 2004-111374
[Patent Document 2] Japanese Laid-Open Patent Publication No. 2004-342605
[Patent Document 3] Japanese Laid-Open Patent Publication No. 2007-305461

SUMMARY OF INVENTION

Technical Problem

The inventors of the present invention have disclosed in Patent Document 3 that, in an electricity storage device in which such organic compounds are used as active substances, it is preferable to use, as a solvent of the electrolyte solution, an organic solvent such as ethylene carbonate, propylene carbonate, dimethyl carbonate, diethyl carbonate, methyl ethyl carbonate, $\gamma$-butyrolactone, tetrahydrofuran, dioxolane, sulfolane, or dimethylformamide.

However, upon producing electricity storage devices by using various electrolyte solutions with the polymer compound having a $\pi$ electron conjugated cloud disclosed in Patent Document 3 and evaluating their characteristics in more detail, a problem was found in that the discharge capacity may become lower than a design capacity, depending on the electrolyte solution used. Therefore, when an electricity storage device is produced by using the polymer compound having a $\pi$ electron conjugated cloud disclosed in Patent Document 3, there may be limits on the usable types of solvents for the electrolyte solution, thus making it difficult to design an electricity storage device so as to maximize the characteristics of the polymer compound.

Moreover, although it is disclosed that an electricity storage device having a high capacity, a high output power, and excellent cyclic characteristics can be obtained by using the polymer compound having a π electron conjugated cloud as a side chain that is disclosed in Patent Document 3, not enough information concerning the molecular structure of a polymer compound that makes it possible to provide an electricity storage device having particularly excellent characteristics is disclosed.

The present invention solves the problems of such conventional techniques, and aims to provide an electricity storage material having a high capacity, a high output power, and excellent cyclic characteristics regardless of the type of electrolyte solution, as well as an electricity storage device in which the same is used.

Solution to Problem

An electricity storage material according to the present invention is an electricity storage material containing a copolymer compound of first units and second units, each first unit having a side chain which is an oxidation-reduction site having a π conjugate electron cloud and being of a structure represented by general formula (1) below, and each second unit having no oxidation-reduction reaction site as a side chain, wherein, in general formula (1), $X_1$ to $X_4$ are, independently, a sulfur atom, an oxygen atom, a selenium atom, or a tellurium atom; $R_1$ and $R_2$ are, independently, an acyclic or cyclic aliphatic group including at least one kind selected from the group consisting of a carbon atom, an oxygen atom, a nitrogen atom, a sulfur atom, a silicon atom, a phosphorus atom, and a boron atom, each including at least one or more double bonds; and one of $R_1$ and $R_2$ includes a bonding hand for binding to another portion which is a main chain or a side chain of the copolymer compound.

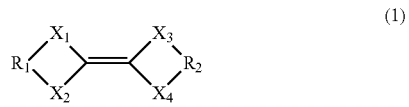

(1)

In a preferred embodiment, the copolymer compound has a structure represented by general formula (1') below, and in general formula (1'), $X_1$ to $X_4$ are, independently, a sulfur atom, an oxygen atom, a selenium atom, or a tellurium atom; a selected one among Ra to Rd is a bonding hand for binding to another portion which is a main chain or a side chain of the copolymer compound, and the other three of Ra to Rd are, independently, an acyclic aliphatic group, a cyclic aliphatic group, a hydrogen atom, a hydroxyl group, a cyano group, an amino group, a nitro group, a nitroso group, or an alkylthio group.

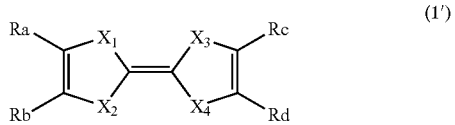

(1')

An electricity storage material according to the present invention is an electricity storage material containing a copolymer compound of first units and second units, each first unit having a side chain which is an oxidation-reduction site having a π conjugate electron cloud and being of a structure represented by general formula (2) or general formula (3) below, and each second unit having no oxidation-reduction reaction site as a side chain, wherein, in general formulae (2) and (3), X is a sulfur atom, an oxygen atom, a selenium atom, or a tellurium atom; a selected one of $R_3$ to $R_6$ is a bonding hand for binding to another portion which is a main chain or a side chain of the copolymer compound, and the other three of $R_3$ to $R_6$ are, independently, an acyclic aliphatic group, a cyclic aliphatic group, a hydrogen atom, a hydroxyl group, a cyano group, an amino group, a nitro group, a nitroso group, or an alkylthio group; and $R_7$ and $R_8$ are, independently, an acyclic or cyclic aliphatic group including at least one kind selected from the group consisting of a carbon atom, an oxygen atom, a nitrogen atom, a sulfur atom, a silicon atom, a phosphorus atom, a boron atom, and a halogen atom, or a hydrogen atom.

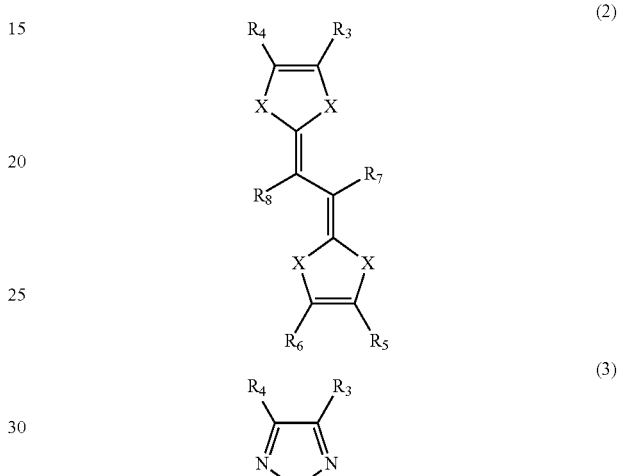

(2)

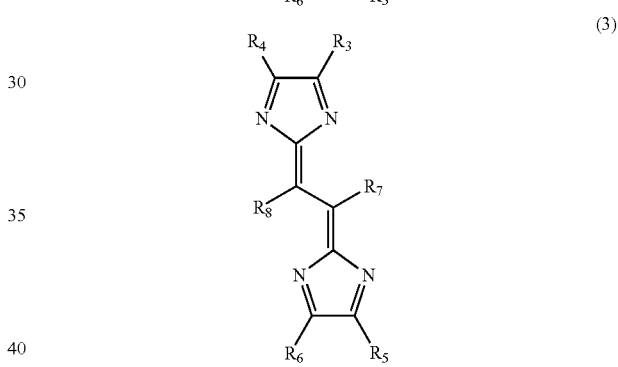

(3)

In a preferred embodiment, the second unit includes a side chain which is a functional group having affinity with a non-aqueous solvent.

In a preferred embodiment, the second unit includes a side chain which is at least one kind selected from the group consisting of an ester group, an ether group, a carbonyl group, a cyano group, a nitro group, a nitroxyl group, an alkyl group, a phenyl group, an alkylthio group, a sulfone group, and a sulfoxide group.

In a preferred embodiment, the copolymer compound has a structure represented by general formula (4) below; in general formula (4), $R_9$ and $R_{10}$ constitute a main chain of the copolymer compound, and $R_9$ and $R_{10}$ are trivalent residues containing, independently: at least one selected from the group consisting of a carbon atom, an oxygen atom, a nitrogen atom, and a sulfur atom; and at least one substituent selected from the group consisting of saturated aliphatic groups and unsaturated aliphatic groups having a carbon number from 1 to 10 or at least one hydrogen atom; $L_1$ is an ester group, an ether group, a carbonyl group, a cyano group, a nitro group, a nitroxyl group, an alkyl group, a phenyl group, an alkylthio group, a sulfone group, or a sulfoxide group that is bound to $R_9$; $R_{12}$ is a divalent residue including at least one selected from the group consisting of a substituted or unsubstituted alkylene, alkenylene, arylene, ester, amide, and ether having a carbon number from 1 to 4 that are bound to $R_{10}$ and $M_1$; and $M_1$ is general formula (1), (2) or (3), and is bound to $R_{12}$ via the bonding hand, where n and m are integers representing a number of times of repeating monomer units.

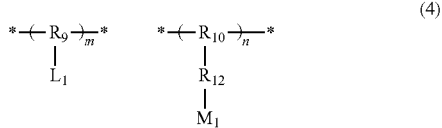
(4)

In a preferred embodiment, the copolymer compound is represented by formula (5) below; in general formula (5), $R_{12}$ is a divalent residue including at least one selected from the group consisting of a substituted or unsubstituted alkylene, alkenylene, arylene, ester, amide, and ether having a carbon number from 1 to 4; $R_{13}$ and $R_{14}$ are, independently, one selected from the group consisting of a saturated aliphatic group having a carbon number of 1 to 4 and a phenyl group, or a hydrogen atom; $R_{15}$ to $R_{17}$ are, independently, an acyclic aliphatic group, a cyclic aliphatic group, a hydrogen atom, a hydroxyl group, a cyano group, an amino group, a nitro group, a nitroso group, or an alkylthio group; $L_1$ is an ester group, an ether group, a carbonyl group, a cyano group, a nitro group, a nitroxyl group, an alkyl group, a phenyl group, an alkylthio group, a sulfone group, or a sulfoxide group; and n and m are integers representing a number of times of repeating monomer units.

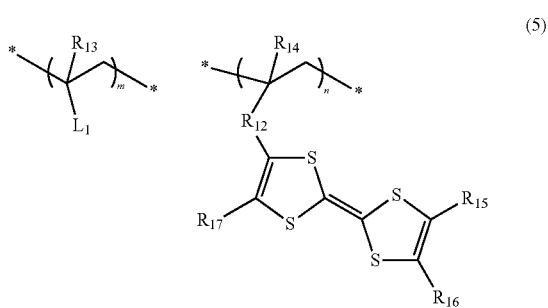
(5)

In a preferred embodiment, wherein $L_1$ includes at least one kind selected from the group consisting of an ester group, an ether group, and a carbonyl group.

In a preferred embodiment, the copolymer compound has a structure represented by formula (6) below, and in formula (6), n and m are integers representing a number of times of repeating monomer units.

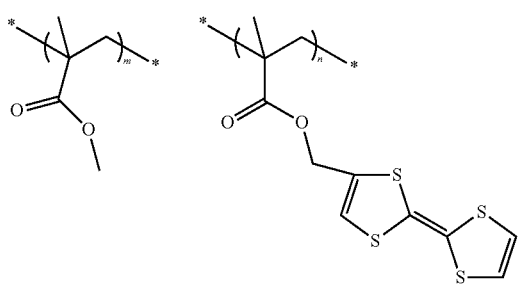
(6)

In a preferred embodiment, a constituent ratio m/n of the number n of first units composing the copolymer compound to the number m of second units is greater than 0 and equal to or less than 5.

An electrode according to the present invention comprises: an electrically conductive support; and an electricity storage layer provided on the electrically conductive support, the electricity storage layer containing any of the above electricity storage materials.

In a preferred embodiment, the electricity storage layer contains an electrically conductive substance.

An electrochemical element according to the present invention comprises a positive electrode, a negative electrode, and an electrolyte solution disposed between the positive electrode and the negative electrode, wherein at least one of the positive electrode and the negative electrode includes the above electrode.

In a preferred embodiment, the electrolyte solution contains a salt of quaternary ammonium cations and anions.

An electricity storage device according to the present invention comprises a positive electrode, a negative electrode, and an electrolyte solution interposed between the positive electrode and the negative electrode, wherein at least one of the positive electrode and the negative electrode includes the above electrode.

An electricity storage device according to the present invention comprises: a positive electrode including the above electrode; a negative electrode containing a negative-electrode active substance capable of occluding and releasing lithium ions; and an electrolyte solution containing a salt of lithium ions and anions, the electrolyte solution filling between the positive electrode and the negative electrode.

A portable electronic device according to the present invention comprises the above electricity storage device.

A vehicle according to the present invention comprises the above electricity storage device.

Advantageous Effects of Invention

An electricity storage material according to the present invention includes oxidation-reduction sites of a structure represented by general formulae (1) to (3) in side chains of its first units, thus being able to repetitively undergo oxidation-reduction reactions in a stable manner. Moreover, since the copolymer compound includes second units having no oxidation-reduction reaction site as a side chain, gaps are provided for a solvent to move for solvation of the oxidation-reduction sites in a state where the structure represented by general formulae (1) to (3) is oxidized. As a result, oxidation/reduction of the structure represented by general formulae (1) to (3) progresses smoothly, and an oxidation occurs to an oxidation state that the side chains of the first units permit.

Therefore, by using the electricity storage material according to the present invention, there is a realized an electricity storage device having a high output power, a high capacity, and excellent cyclic characteristics, the electricity storage device providing a high design freedom.

DESCRIPTION OF EMBODIMENTS

Hereinafter, with reference to the drawings, an embodiment of an electricity storage material and an electricity storage device according to the present invention will be described. In the present embodiment, the electricity storage device according to the present invention and the electricity storage material according to the present invention will be described by taking a lithium secondary battery for example. However, the present invention is not limited to the positive-electrode active substance of a lithium secondary battery or a lithium secondary battery, but is also suitably used for a capacitor utilizing chemical reactions, and so on.

Figure 1:
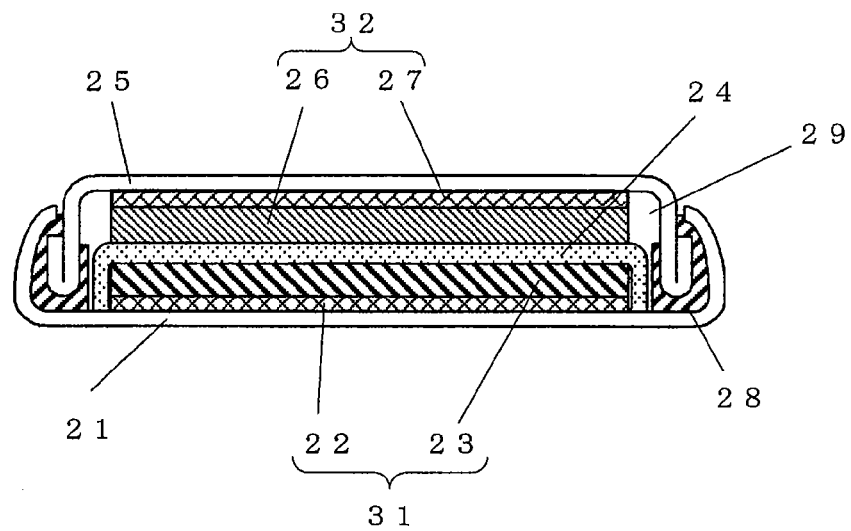
FIG. 1 A schematic cross-sectional view showing a coin-type secondary battery as an embodiment of an electricity storage device according to the present invention.

FIG. 1 is a cross-sectional view schematically showing a coin-type lithium secondary battery as an embodiment of the electricity storage device according to the present invention. The coin-type lithium secondary battery shown in FIG. 1 includes a positive electrode 31, a negative electrode 32, and a separator 24. The positive electrode 31 includes a positive-electrode active substance layer 23 and a positive current collector 22, the positive-electrode active substance layer 23 being supported by the positive current collector 22. Similarly, the negative electrode 32 includes a negative-electrode active substance layer 26 and a negative current collector 27, the negative-electrode active substance layer 26 being supported by the negative current collector 27.

As will be specifically described below, the positive-electrode active substance layer 23 contains an electricity storage material according to the present invention as a positive-electrode active substance. As the positive current collector 22, a metal foil or metal mesh composed of aluminum, gold, silver, a stainless steel, an aluminum alloy, or the like, or a resin film which contains an electrically conductive filler composed of any such metal is used, for example.

The negative-electrode active substance layer 26 contains a negative-electrode active substance. As the negative-electrode active substance, any known negative-electrode active substance that reversibly occludes and releases lithium is used. For example, materials capable of reversibly occluding and releasing lithium, e.g., graphite materials such as natural graphite and artificial graphite, amorphous carbon materials, lithium metal, lithium-containing composite nitride, lithium-containing titanium oxide, silicon, silicon-containing alloys, silicon oxide, tin, tin-containing alloys, and tin oxide, or, carbon materials having an electric double layer capacity such as activated carbon, organic compound materials having a π electron conjugated cloud, and the like can be used. These negative electrode materials may each be used by itself, or a plurality of negative electrode materials may be mixed for use. For the negative current collector 27, any material known as a current collector of a negative electrode for a lithium ion secondary battery, e.g., copper, nickel, and stainless steel, can be used. Similarly to the positive current collector 22, the negative current collector 27 can also be used in forms such as a metal foil or metal mesh, a resin film containing an electrically conductive filler composed of a metal, and so on.

The positive-electrode active substance layer 23 or the negative-electrode active substance layer 26 may each contain only a positive-electrode active substance or a negative-electrode active substance, or may contain one or both of an electrical conductivity agent and a binder agent.

As electrical conductivity agents, various electron-conductive materials that do not induce any chemical change at the charging and discharging potentials of the positive-electrode active substance and the negative-electrode substance can be used. For example, carbon materials such as carbon black, graphites, and acetylene black, electrically conductive polymers such as polyaniline, polypyrrole, and polythiophene, electrically conductive fibers such as carbon fiber and metal fiber, metal powders, electrically conductive whiskers, electrically conductive metal oxides, and the like may each be used by itself, or they may be used as a mixture. Moreover, as an ion conductivity assistant, a solid electrolyte of polyethylene oxide or the like, or a gel electrolyte of polymethyl methacrylate or the like may be contained in the positive electrode.

The binder agent may be either a thermoplastic resin or a thermosetting resin. For example, polyolefin resins such as polyethylene and polypropylene, fluorine-type resins such as polytetrafluoroethylene (PTFE), polyvinylidene fluoride (PVDF), and hexafluoropropylene (HFP), copolymer resins thereof, styrene-butadiene rubber, polyacrylic acid or a copolymer resin thereof, and the like are usable as binder agents.

The positive electrode 31 and the negative electrode 32 oppose each other with the separator 24 interposed therebetween, such that the positive-electrode active substance layer 23 and the negative-electrode active substance layer 26 are in contact with the separator 24, whereby an electrode group is constituted. The separator 24 is a resin layer composed of a resin which does not have electron conductivity, and is a microporous film having a large ion transmission and a predetermined mechanical strength and electrical insulation. From a standpoint of providing an excellent organic solvent-resitant ability and an excellent hydrophobicity, a polyolefin resin in which polypropylene, polyethylene, or the like is used by itself or in which these are combined is preferable. Instead of the separator 24, a resin layer having electron conductivity which swells by containing an electrolyte solution and functions as a gel electrolyte may be provided.

The electrode group is accommodated in the internal space of a case 21. In the internal space of the case 21, an electrolyte solution 29 is injected, so that the positive electrode 31, the negative electrode 32, and the separator 24 are impregnated with the electrolyte solution 29. Since the separator 24 includes minute spaces for retaining the electrolyte solution 29, the electrolyte solution 29 is retained in the minute spaces, such that the electrolyte solution 29 is interposed between the positive electrode 31 and the negative electrode 32. An opening of the case 21 is sealed by a sealing plate 25, using a gasket 28.

The electrolyte solution 29 is composed of a nonaqueous solvent and a supporting salt which dissolves in the nonaqueous solvent. As the nonaqueous solvent, known solvents which can be used for nonaqueous secondary batteries and nonaqueous-type electric double layer capacitors are usable. Specifically, solvents containing a cyclic carbonic acid ester are suitably used because cyclic carbonic acid esters have a very high relative dielectric constant, as is typified by ethylene carbonate and propylene carbonate. Among cyclic carbonic acid esters, propylene carbonate is preferable because it has a freezing point of −49° C., which is lower than that of ethylene carbonate, thus allowing the electricity storage device to operate at low temperatures.

Moreover, solvents containing cyclic esters are also suitably used. The reason is that cyclic esters have a very high relative dielectric constant, as is typified by γ-butyrolactone; therefore, when any such solvent is contained as a component, the entire nonaqueous solvent of the electrolyte solution 29 can have a very high dielectric constant.

As the nonaqueous solvent, any one of these may be used by itself, or a plurality of solvents may be mixed for use. Other solvents that are usable as the solvent include acyclic carbonic acid esters, acyclic esters, cyclic or acyclic ethers, and the like. Specifically, nonaqueous solvents such as dimethyl carbonate, diethyl carbonate, methyl ethyl carbonate, tetrahydrofuran, dioxolane, sulfolane, dimethylformamide, acetonitrile, and dimethyl sulfoxide can be used.

As will be specifically described below, the electricity storage material according to the present invention is capable of performing charging and discharging with a high energy density regardless of the value of a relative dielectric constant of the nonaqueous solvent, and has excellent cyclic characteristics. Therefore, excellent characteristics can be exhibited when any of nonaqueous solvents having various values of relative dielectric constant is used by itself or when two or more of them are mixed.

As the supporting salt, a salt composed of the following anions and cations can be used. As anion species, halide anions, perchlorate anions, trifluoromethanesulfonate anions, boron tetrafluoride anions, hexafluorophosphate anions, trifluoromethanesulfonate anions, nonafluoro-1-butanesulfonate anions, bis(trifluoromethanesulfonyl)imide anions, bis(perfluoroethylsulfonyl)imide anions, and the like can be used. As cation species, alkali metal cations such as lithium, sodium, and potassium, alkaline-earth metal cations such as magnesium, quaternary ammonium cations such as tetraethylammonium and 1-Ethyl-3-methylimidazolium, and the like can be used.

As the cation species, quaternary ammonium cations or lithium cations are preferably used. The reasons are as follows. Quaternary ammonium cations have a high ion mobility, and make it possible to provide an electrolyte solution having a high electrical conductivity, and also allow a negative electrode having an electric double layer capacity such as activated carbon which has a fast reaction rate to be used as the counter electrode, thus making it possible to provide an electricity storage device with a high output power. On the other hand, lithium cations allow a negative electrode capable of occluding and releasing lithium which has a low reaction potential and a high capacity density to be used as the counter electrode, thus making it possible to provide an electricity storage device with a high voltage and a high energy density.

Figure 2:
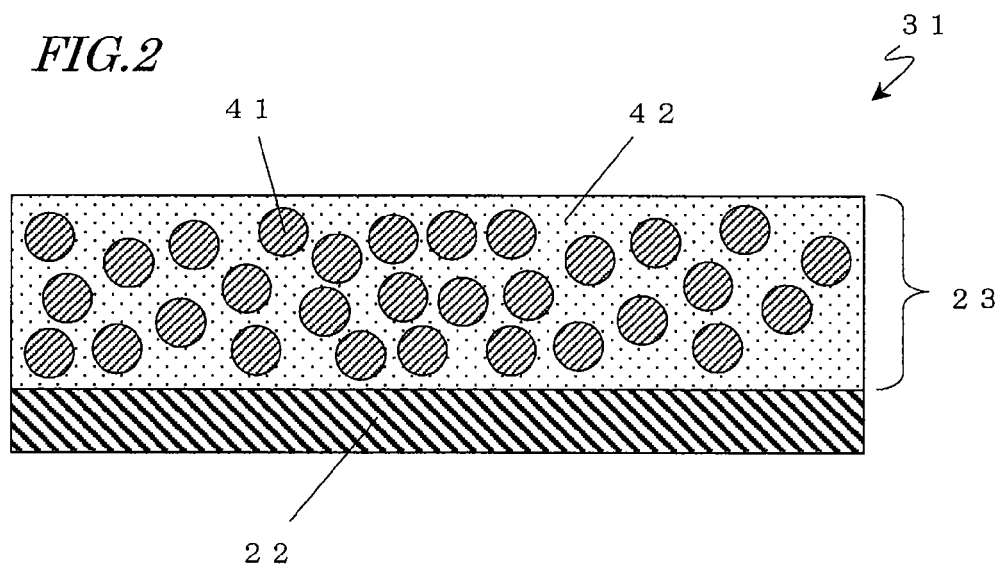
FIG. 2 A cross-sectional view showing the structure of a positive electrode of the secondary battery in FIG. 1.

FIG. 2 is a schematic cross-sectional view showing enlarged the structure of the positive electrode 31. The positive-electrode active substance layer 23 supported by the positive current collector 22 includes positive-electrode active substance particles 41 and an electrical conductivity agent section 42 which is composed of an electrical conductivity agent and a binder agent. The electrical conductivity agent section 42 has a porous structure so as to be able to retain the electrolyte solution 29. Although FIG. 2 shows the positive-electrode active substance particles 41 with schematic circles, each positive-electrode active substance particle 41 has a particle shape such that an acyclic polymer has folded up and aggregated. Due to the folding-up of the acyclic polymer, vacancies are formed such that the electrolyte solution 29 can intrude into the particles. Although each positive-electrode active substance particle 41 has an approximately spherical shape, there is no particular limitation so long as it has a shape that is formed by polymer aggregation. The size of the positive-electrode active substance particles 41 is approximately 0.5 μm to 10 μm.

Hereinafter, an electricity storage material to be used as the positive-electrode active substance particles 41 will be specifically described. The electricity storage material according to the present invention is an organic compound which reversibly undergoes oxidation-reduction reactions. Specifically, the electricity storage material according to the present invention contains a copolymer compound of first units and second units, each first unit having a side chain which is an oxidation-reduction site having a π conjugate electron cloud and being of a structure represented by any of general formula (1) to general formula (3) below, and each second unit having no oxidation-reduction reaction site as a side chain. In the present specification, a side chain means, in a copolymer compound, any carbon chain that branches out from a main chain, which is the longest sequence of carbons. Atoms other than carbon may be contained in the main chain and the side chains.

In general formula (1) below, X1 to X4 are, independently, a sulfur atom, an oxygen atom, a selenium atom, or a tellurium atom, i.e., a chalcogen atom. $R_1$ and $R_2$ are, independently, an acyclic or cyclic aliphatic group including at least one kind selected from the group consisting of a carbon atom, an oxygen atom, a nitrogen atom, a sulfur atom, a silicon atom, a phosphorus atom, and a boron atom, and each include at least one or more double bonds. One of $R_1$ and $R_2$ includes a bonding hand for binding to another portion which is a main chain or a side chain of the copolymer compound.

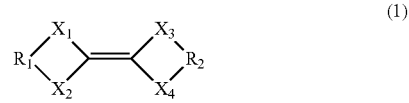

(1)

In general formulae (2) and (3) below, X is a sulfur atom, an oxygen atom, a selenium atom, or a tellurium atom. A selected one of $R_3$ to $R_6$ is a bonding hand for binding to another portion which is a main chain or a side chain of the copolymer compound, and the other three of $R_3$ to $R_6$ are, independently, an acyclic aliphatic group, a cyclic aliphatic group, a hydrogen atom, a hydroxyl group, a cyano group, an amino group, a nitro group, a nitroso group, or an alkylthio group. $R_7$ and $R_8$ are, independently, a hydrogen atom, or an acyclic or cyclic aliphatic group including at least one kind selected from the group consisting of a hydrogen atom, a carbon atom, an oxygen atom, a nitrogen atom, a sulfur atom, a silicon atom, a phosphorus atom, a boron atom, and a halogen atom.

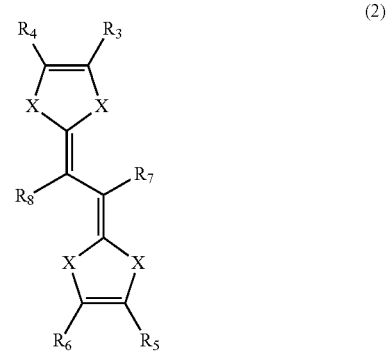

(2)

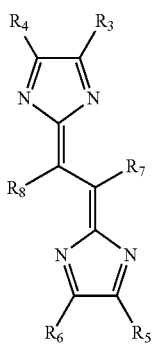

(3)

In the structure represented by general formula (1), $R_1$ and $R_2$ each include at least one or more double bonds, and therefore at least one π electron conjugated cloud is included in a cyclic structure including $X_1$ and $X_2$ and in a cyclic structure including $X_3$ and $X_4$.

The structure represented by general formula (2) includes two cyclic structures containing chalcogen atoms, and at least one carbon-carbon double bond exists in each cyclic structure. Therefore, a π electron conjugated cloud is formed over the molecule of the structure represented by general formula (2), due to lone pairs of π electrons of the carbon-carbon double bonds and the chalcogen atoms.

The structure represented by general formula (3) includes two cyclic structures, and in each cyclic structure, two carbon-nitrogen double bonds exist via a carbon-carbon single bond. Therefore, with the π electrons of the double bonds, a π electron conjugated cloud is formed over the molecule of the structure represented by general formula (3).

The π electron conjugated clouds of general formulae (1) to (3) are capable of electron exchange, such that one electron per cyclic structure can be released.

In the case where each first unit include the structure defined by general formula (1), it is preferable that the first unit includes a tetrachalcogenofulvalene structure in which $R_1$ and $R_2$ are ethylene groups (—CH═CH—). Specifically, it is preferable that the first unit has a structure represented by general formula (1') below.

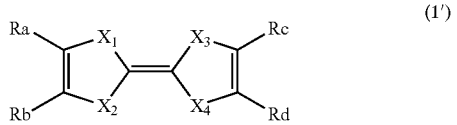

Herein, $X_1$ to $X_4$ are, independently, a sulfur atom, an oxygen atom, a selenium atom, or a tellurium atom. A selected one among Ra to Rd is a bonding hand for binding to another portion which is a main chain or a side chain of the copolymer compound, and the other three among Ra to Rd are, independently, an acyclic aliphatic group, a cyclic aliphatic group, a hydrogen atom, a hydroxyl group, a cyano group, an amino group, a nitro group, a nitroso group, or an alkylthio group.

When X1 to X4 are sulfur atoms in the structure represented by general formula (1'), the structure of general formula (1') is tetrathiafulvalene (also abbreviated as TTF).

As represented by formula (7) below, when tetrathiafulvalene is subjected to one-electron oxidation in a state dissolved in an electrolyte solution, one of the two five-membered rings loses an electron and becomes positively charged. Therefore, a counter-anion (which in this case is $PF_6^-$) is coordinated to the tetrachalcogenofulvalene structure. Furthermore, upon one-electron oxidation, the other five-membered ring loses an electron, and becomes positively charged. Therefore, another counter-anion is coordinated to the cyclic structure.

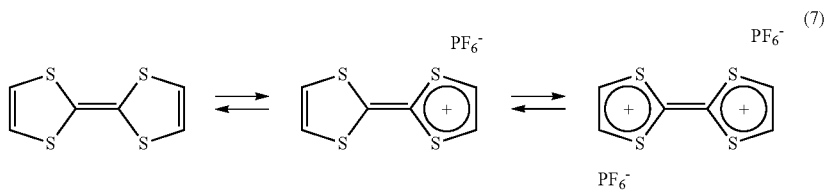

A cyclic structure is stable even in an oxidized state, and is reduced by receiving an electron, thus being able to return to an electrically neutral state. Therefore, by utilizing these reversible oxidation-reduction reactions, the tetrachalcogenofulvalene structure can be used as an electricity storage material which is capable of storing electric charge.

For example, when tetrathiafulvalene is used for the positive electrode of a lithium secondary battery, during discharging, the tetrachalcogenofulvalene structure takes an electrically neutral state, i.e., a state on the left side of formula (7). Moreover, in a charged state, the tetrachalcogenofulvalene structure takes a positively charged state, i.e., a state on the right side of formula (7).

Each second unit has no oxidation-reduction reaction site as a side chain. More specifically, each second unit has no site that electrochemically undergoes oxidation-reduction reactions in the potential range in which the structures represented by general formulae (1) to (3) would undergo oxidation-reduction reactions, and the side chain of the second unit is neither oxidized nor reduced in the potential range in which the structures represented by general formulae (1) to (3) would undergo oxidation-reduction reactions. More preferably, the second unit includes a side chain which is a functional group having affinity with a nonaqueous solvent. Structures having such chemical characteristics include: an ester group, an ether group, and a carbonyl group, which are oxygen-containing functional groups; a cyano group, a nitro group, and a nitroxyl group, which are nitrogen-containing functional groups; an alkyl group and a phenyl group, which are functional groups composed of carbon; an alkylthio group, a sulfone group, and a sulfoxide group, which are sulfur-containing functional groups; and so on. Preferably, the second unit includes a side chain which includes at least one kind, or two or more kinds, selected from among them.

There is no particular limitation as to the end portion of the functional group such as an ester group, an ether group, a carbonyl group, a sulfone group, or a sulfoxide group; however, alkyl groups having a small carbon number such as a methyl group or an ethyl group, and aromatic groups are desirable. Examples of preferable ester groups include alkyl esters represented as (—COO—CH$_3$), (—COO—C$_2$H$_5$) and phenyl esters (—COO—C$_6$H$_5$). Examples of preferable ether groups include an alkyl ether represented as (—O—CH$_3$), (—O—C$_2$H$_5$) phenyl ether (—O—C$_6$H$_5$), and so on. Examples of preferable carbonyl groups include (—C(=O)—CH$_3$), (—C(=O)—C$_2$H$_5$), (—C(=O)—C$_6$H$_5$), and so on. Preferable sulfone groups include (—S(=O)$_2$—CH$_3$), (—S(=O)$_2$—C$_2$H$_5$), (—S(=O)$_2$—C$_6$H$_5$), and so on. Preferable sulfoxide groups include (—S(=O)—CH$_3$), (—S(=O)—C$_2$H$_5$), (—S(=O)—C$_6$H$_5$), and so on.

There is no particular limitation as to the main chain of the copolymer compound, but a trivalent residue which contains at least one selected from the group consisting of a carbon atom, an oxygen atom, a nitrogen atom, and a sulfur atom is contained as a repetition unit. The repetition unit may contain a substituent selected from the group consisting of saturated aliphatic groups and unsaturated aliphatic groups having a carbon number from 1 to 10. In other words, the repetition unit includes at least one hydrogen or a substituent selected from the group consisting of saturated aliphatic groups and unsaturated aliphatic groups having a carbon number from 1 to 10. Specifically, it may be polyethylene or polypropylene, which are saturated hydrocarbons, polyacetylene, which is an unsaturated hydrocarbon, polycarbonate and polystyrene including aromatics, as well as what is obtained by substituting a portion of such protons with a halogen, and so on.

Preferably, the copolymer compound composed of first units and second units has a large degree of polymerization so as not to dissolve in any organic solvent. Specifically, it is preferable that a total number of first units and second units contained in the copolymer compound is 4 or more, i.e., the degree of polymerization is 4 or more. As a result, an electricity storage material which is unlikely to dissolve in any organic solvent is realized. More preferably, the degree of polymerization of the polymer is 10 or more, and even more preferably, no less than 20 and no more than 4000.

The constituent ratio m/n of the number m of second units to the number n of first units composing the copolymer compound can be changed arbitrarily, but is preferably greater than 0 and equal to or less than 5 in order to realize an electricity storage material that reconciles a high capacity, a high output power, and excellent cyclic characteristics.

In other words, the copolymer compound contained in the electricity storage material according to the present invention can be represented by general formula (4) below.

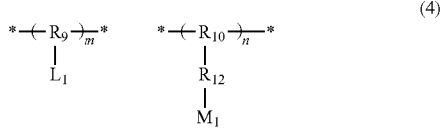

(4)

Herein, $R_9$ and $R_{10}$ constitute the main chain of the copolymer compound. $R_9$ and $R_{10}$ are trivalent residues containing, independently: at least one selected from the group consisting of a carbon atom, an oxygen atom, a nitrogen atom, and a sulfur atom; and at least one substituent selected from the group consisting of saturated aliphatic groups and unsaturated aliphatic groups having a carbon number from 1 to 10 or at least one hydrogen. $L_1$ is an ester group, an ether group, a carbonyl group, a cyano group, a nitro group, a nitroxyl group, an alkyl group, a phenyl group, an alkylthio group, a sulfone group, or a sulfoxide group that is bound to $R_9$. $R_{12}$ is a divalent residue including at least one selected from the group consisting of a substituted or unsubstituted alkylene, alkenylene, arylene, ester, amide, and ether having a carbon number of 1 to 4 that are bound to $R_{10}$ and $M_1$. $M_1$ is general formula (1), (2) or (3), and is bound to $R_{12}$ via the aforementioned bonding hand, where n and m are integers representing the numbers of times of repeating the monomer units.

$R_9$ and $R_{10}$ may include any side chain other than $M_1$ and L1 as represented by general formula (4). Moreover, m+n is preferably 4 or more, more preferably 10 or more, and even more preferably no less than 20 and no more than 4000. It is preferable that m/n is greater than 0 and equal to or less than 5. Repetition units containing $L_1$ and repetition units containing $M_1$ may be arrayed regularly or randomly.

The copolymer compound contained in the electricity storage material according to the present invention has oxidation-reduction sites of a structure represented by general formulae (1) to (3) as its first units, and therefore is capable of repetitively undergoing reversible oxidation-reduction reactions, as described earlier. Moreover, since second units having no oxidation-reduction reaction site as a side chain are contained in the copolymer compound, oxidation/reduction of the structure represented by general formulae (1) to (3) progresses smoothly.

Hereinafter, the reasons thereof will be described, first with reference to the conventional polymer compound disclosed in Patent Document 3.

The polymer compound disclosed in Patent Document 3, as represented by formula (8)(hereinafter referred to as polymer compound 8), has a main chain of polyvinyl alcohol and a side chain of carboxytetrathiafulvalene. In other words, in the meaning of the copolymer compound according to the present invention, it is composed only of the first units having an oxidation-reduction site and includes no second units.

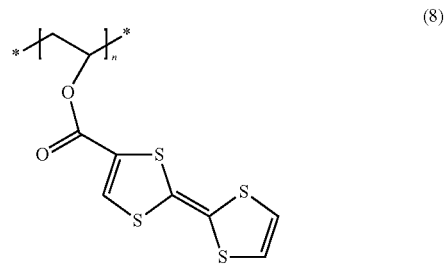

(8)

Polymer compound 8 has the tetrathiafulvalene structure, and oxidation of two electrons is possible per tetrathiafulvalene structure, as described above. When this polymer compound is used as an electricity storage material for a secondary battery, in a state where the secondary battery has been charged, it is positively charged as the tetrathiafulvalene becomes oxidized by releasing electrons, as represented by formula (8').

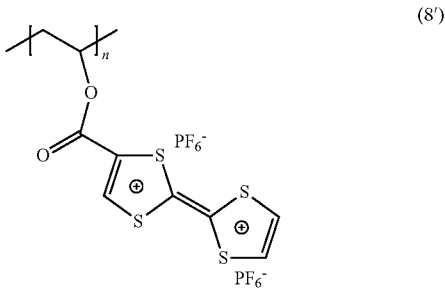

(8')

At this time, electrolyte anions (PF$_6^-$) having a negative charge are coordinated to the tetrathiafulvalene, which thus takes a charged state. The tetrathiafulvalene in a charged state becomes electrically neutral upon receiving electrons, or enters a discharged state by releasing electrolyte anions. Thus, the polymer active substance reversibly repeats the charged state as in formula (8') and discharged state as in formula (8).

As represented by formula (8'), when electrolyte anions are coordinated to the tetrathiafulvalene, it is considered that Coulomb attraction acts between the positively-charged tetrathiafulvalene and the electrolyte anions having a negative charge. When this Coulomb attraction is large, the electrolyte anions are strongly trapped by the tetrathiafulvalene. As a result, in the positive-electrode active substance particles containing polymer compound 8 as the active substance, the electrolyte anions are trapped near the surface of the particles, thus making it difficult for the electrolyte anions to enter into the gaps formed in the particles. As a result, only a capacity which is less than the design capacity of the secondary battery is available, such that the characteristic feature of the organic compound, i.e., a high charge density per unit weight, cannot be exhibited.

The inventors have found that, in such a case, a solvent having a high relative dielectric constant may be chosen as a solvent of the electrolyte solution because it will permit solvation of the tetrathiafulvalene which has been positively charged through charging, thus alleviating the electrostatic attraction between the polymer within the positive-electrode active substance particles and the electrolyte anions. In the polymer compound represented by formula (8), in the case where a solvent obtained by allowing propylene carbonate (PC) and ethylene carbonate (EC) having high relative dielectric constants to be mixed at a volume ratio of 1:1 is used, for example, propylene carbonate and ethylene carbonate allow the positively-charged tetrathiafulvalene to solvate, as represented by formula (9). As a result, the electrolyte anions will no longer be captured even when strongly drawn to the charged tetrathiafulvalene, and thus will be able to move within the positive-electrode active substance particles. Thus it is considered that, even when the surface layer portion of the active substance particles has been charged, the electrolyte anions will not be trapped at the surface layer portion of the active substance particles, and are able to pass from the electrolytic solution into the surface layer portion of the active substance and enter into the central portion of the active substance, so that the active substance particles are available for charging and discharging, even into the interiors of the particles.

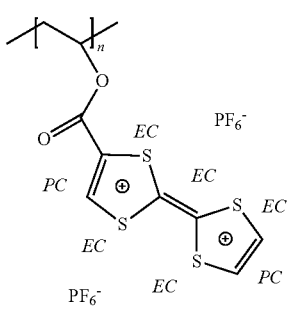

(9)

It is generally known that, in a solvent in which a salt composed of anions and cations is mixed, in order to allow the salt to dissociate so that the respective ions can move alone, it is effective to use a solvent having a high relative dielectric constant. This is because a solvent having a high relative dielectric constant allows salt cations to be solvated with a higher priority and alleviates the electrostatic attraction between anions and cations. Therefore, even in the active substance particles of a polymer having a cyclic π conjugate electron cloud, with a similar mechanism thereto, a solvent having a high relative dielectric constant will presumably allow the charged tetrathiafulvalene to be solvated with a higher priority, thus alleviating the electrostatic attraction between anions and cations.

However, since polymer compound 8 only has a side chain that includes an oxidation-reduction reaction site, the gap around the oxidation-reduction site is relatively narrow, thus making it difficult for the solvent to come close to the oxidized tetrathiafulvalene. Therefore, it is necessary that the solvent has a higher relative dielectric constant in order for the solvent to exhibit a solvation effect even at a position which is relatively remote from the tetrathiafulvalene. Through a detailed study of the inventors, it has been found that, with respect to polymer compound 8, the capacity of the secondary battery will be much lower than the design capacity when the relative dielectric constant of the solvent at 20° C. is less than 55.

On the other hand, the copolymer compound of the electricity storage material according to the present invention includes second units having no oxidation-reduction reaction site as a side chain. For example, the copolymer compound represented by formula (6) is structured so that tetrathiafulvalene is bound to terminal carbons of some of the methoxycarbonyl groups, which are the side chains of polymethyl methacrylate (PMMA). Since the tetrathiafulvalene is introduced in only some of the methoxycarbonyl groups, the methoxycarbonyl groups in which tetrathiafulvalene is not introduced lack oxidation-reduction reaction sites as their side chains.

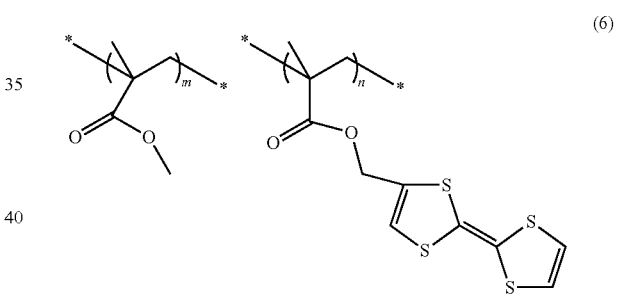

(6)

Due to the presence of the second units having no oxidation-reduction reaction site as a side chain, such a copolymer compound has some flexibility at the oxidation-reduction sites the first units having the structure represented by general formulae (1) to (3), and side chain lengths differ between the units. Thus, it is presumable that molecular level interspaces are likely to occur within the copolymer compound.

The solvent within the electrolyte solution is likely to permeate these interspaces, and since continuous paths for the solvent of the electrolyte solution are formed within the active substance particles, solvent molecules and anions can move into the interior of the active substance particles. As a result, even if the solvent used for the electrolyte solution has a low relative dielectric constant, through charging and discharging reactions, anions will pass through the molecular level interspaces occurring in the copolymer compound of the active substance particles, move inside the active substance particles, and come close to the oxidation-reduction site to realize solvation. Therefore, the oxidation-reduction reaction site is oxidized to an oxidation state that it permits, and thus charging and discharging reactions will progress.

In the case of the copolymer compound of the structure represented by formula (6), when tetrathiafulvalene is oxidized, as represented by formula (6'), tetrathiafulvalene is solvated by propylene carbonate and ethylene carbonate. As a result, whereas the tetrathiafulvalene to which the solvent has been coordinated becomes bulkier, the side chains of the second units do not become bulkier through solvation because they do not have an oxidation-reduction reaction site. As a result, interspaces occur in the side chains of the second units, thus allowing permeation of the solvent in the electrolyte solution.

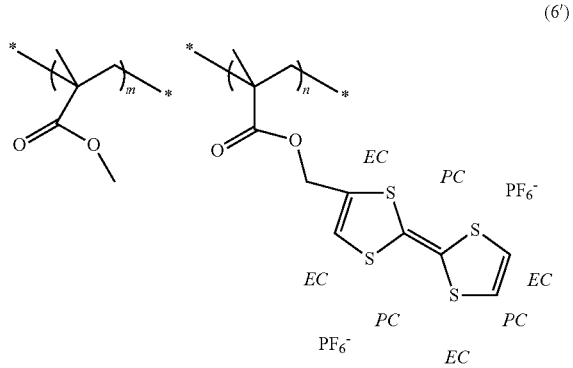

(6')

Thus, by allowing second units having no oxidation-reduction site as a side chain to be contained in the copolymer compound, paths of the solvent can be formed within the active substance particles without causing bulkiness. The aforementioned effects are expectable so long as at least one second unit is included among the units composing the copolymer compound. The constituent ratio m/n of the second units to the first units composing the preferable copolymer compound is greater than 0 and equal to or less than 5. Note that the constituent ratio m/n in the present invention means an average value of a value obtained by dividing the total number of second units composing the copolymer compound by the total number of first units.

As described above, the constituent ratio m/n only needs to be greater than 0 because the effects of the present invention are obtained if the copolymer compound even contains a small amount of second units having no oxidation-reduction site as a side chain. In order to suppress bulkiness, it is preferable that there are as many second units as possible; as m/n becomes larger, the aforementioned effects can be obtained to a greater extent. However, since the second units do not contain any oxidation-reduction sites, the charge density of the copolymer compound will decrease as the second units increase. It has been found through a detailed study of the inventors that, when the constituent ratio m/n is 5 or less, the charge density can be enhanced and oxidation-reduction reactions can be allowed to repetitively occur in a stable manner. In particular, when the constituent ratio m/n is in the range of no less than 1 and no more than 5, an electricity storage device which is capable of performing charging and discharging with a high energy density regardless of the value of a relative dielectric constant of the nonaqueous solvent, and which has excellent cyclic characteristics, is obtained.

From such facts, it is preferable that each second unit includes a side chain which is a functional group having a high affinity with the solvent. Since a nonaqueous solvent is generally used for an electricity storage device, it is more preferable that the second unit includes a side chain which is a functional group having a high affinity with a nonaqueous solvent. For example, an ester group, an ether group, and a carbonyl group, which are oxygen-containing functional groups; a cyano group, a nitro group, and a nitroxyl group, which are nitrogen-containing functional groups; an alkyl group and a phenyl group, which are functional groups composed of carbon; an alkylthio group, a sulfone group, and a sulfoxide group, which are sulfur-containing functional groups; and the like are examples of functional groups having a high affinity with a nonaqueous solvent. As a result, it becomes easier for a solvent to enter the interior of gaps which are formed due to the presence of the second units, thus making it easier for the structure of the first units represented by general formulae (1) to (3) to be solvated. The aforementioned effects will be particularly outstanding when the second unit includes a side chain which is a functional group having a large polarity. Therefore, it is more preferable that the second unit includes a side chain which is an ester group, an ether group, or a carbonyl group, which are oxygen-containing functional groups.

As polymer compounds having a π electron conjugated cloud, polyaniline, polythiophene, and derivatives thereof are known. In these polymer compounds, a resonance structure due to conjugated double bonds is formed across the entire main chain, so that, when electrons are pulled out from the main chain, the resultant positive charge will distribute with a certain expanse across the main chain. As a result, when more electrons are to be pulled out from an adjoining repetition unit, the positive charge occurring due to the pulling-out of the first electron will be delocalized over to the adjoining unit, and electrical repulsion will make it difficult to pull out any electrons from the adjoining unit. This puts a limit on the number of available electrons, thus making it difficult to obtain a high electricity storage capacity.

On the other hand, in the copolymer compound of the electricity storage material according to the present invention, a site represented by general formulae (1) to (3) is included only in side chains of the first units of the copolymer compound. Each side chain is independent, and the oxidation state of a given side chain hardly affects the oxidation-reduction reactions of an adjoining side chain. Therefore, an exchange of electrons corresponding to the number of side chains of the first units is possible, whereby the electricity storage material according to the present invention can attain a high electricity storage capacity.

As described earlier, a preferable embodiment of the electricity storage material according to the present invention includes a tetrathiafulvalene structure in a side chain of each first unit of the copolymer compound. The tetrathiafulvalene structure is stable even in a state of two-electron oxidation as described above, and therefore is suitable for electricity storage materials. Specifically, a structure represented by general formula (5) below is contained in each first unit of the copolymer compound.

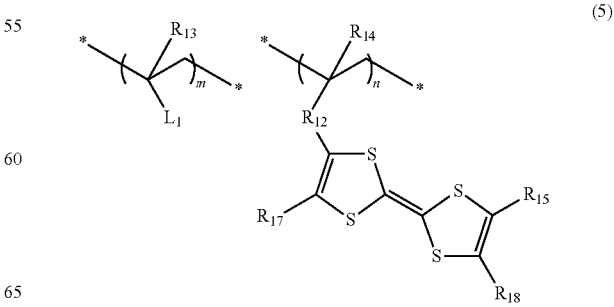

(5)

Herein, $R_{12}$ is a divalent residue including at least one selected from the group consisting of a substituted or unsubstituted alkylene, alkenylene, arylene, ester, amide, and ether having a carbon number from 1 to 4. $R_{13}$ and $R_{14}$ are, independently, one selected from the group consisting of a hydrogen atom, a saturated aliphatic group having a carbon number of 1 to 4, and a phenyl group. $R_{15}$ to $R_{17}$ are, independently, an acyclic aliphatic group, a cyclic aliphatic group, a hydrogen atom, a hydroxyl group, a cyano group, an amino group, a nitro group, a nitroso group, or an alkylthio group. $L_1$ is an ester group, an ether group, a carbonyl group, a cyano group, a nitro group, a nitroxyl group, an alkyl group, a phenyl group, an alkylthio group, a sulfone group, or a sulfoxide group. As described earlier, the tetrathiafulvalene structure is very stable even in an oxidation state, and the oxidation-reduction reactions of the tetrathiafulvalene structure are not much influenced by any structure outside the structure.

Each of the aforementioned copolymer compounds to be used for the electricity storage material according to the present invention may be synthesized by any method so long as it includes the aforementioned first units and second units. For example, a copolymer main-chain compound to become a main chain of the copolymer compound may be synthesized, and thereafter side chains including a structure represented by general formulae (1) to (3) may be introduced to the copolymer main-chain compound. Alternatively, side chains including a structure represented by general formulae (1) to (3) may be introduced to a monomer which is used for the synthesis of a main-chain compound of the copolymer compound, and the copolymer compound may be synthesized by performing synthesis of the main chain. However, in order to prevent rearrangement of active bonding hands during the polymerization reaction, and synthesize a highly regular copolymer compound in which the molecular weight, the mixing ratio between the first units and the second units, and the like are controlled, it is preferable to first synthesize a copolymer main-chain compound to become the main chain, and introduce side chains including a structure represented by general formulae (1) to (3) to the copolymer main-chain compound through a coupling reaction. Examples thereof include a coupling reaction with a halogen element and a hydroxyl group, a coupling reaction with a halogen element and an amino group, and the like. One of a halogen element and a hydroxyl group, or one of a halogen element and an amino group, is introduced into the copolymer main-chain compound, whereas the other is introduced in the side chains. Through a coupling reaction with a halogen element and a hydroxyl group, a copolymer compound is obtained in which the main chain of the copolymer compound and side chains including a structure represented by general formulae (1) to (3) are bound through ester linkages. Moreover, through a coupling reaction of a halogen element and an amino group, a copolymer compound is obtained in which the main chain of the copolymer compound and side chains including a structure represented by general formulae (1) to (3) are bound through amide linkages.

Moreover, side chains including a structure represented by general formulae (1) to (3) may be introduced to a copolymer main-chain compound by allowing dehydration condensation between hydroxyl groups. In this case, a copolymer compound is obtained in which the main chain of the copolymer compound and the side chains including a structure represented by general formulae (1) to (3) are bound through ether linkages. Specific instances will be illustrated in Examples below.

As described above, a copolymer compound contained in the electricity storage material according to the present invention includes oxidation-reduction sites of a structure represented by general formulae (1) to (3) in its first units, thus being able to repetitively undergo oxidation-reduction reactions in a stable manner. Moreover, since the copolymer compound includes second units having no oxidation-reduction reaction site as a side chain, gaps are provided for a solvent to move for solvation in a state where the structure represented by general formulae (1) to (3) is oxidized. As a result, oxidation/reduction of the structure represented by general formulae (1) to (3) progresses smoothly, and an exchange of electrons corresponding to the number of side chains of the first units is enabled. Moreover, since oxidation-reduction reactions progress smoothly, not only a high capacity, but also improvements in electricity storage device characteristics such as output characteristics and cyclic characteristics are expectable.

Therefore, an electricity storage device in which the electricity storage material according to the present invention is used has a high output power, a high capacity, and excellent cyclic characteristics. Particularly outstanding effects are obtained when the constituent ratio between the first units and the second unit is no less than 1 and no more than 5, whereby an electricity storage device having a high capacity, a high output power, and excellent cyclic characteristics can be realized.

From such characteristic features, the electricity storage device according to the present invention is suitably used for vehicles such as hybrid vehicles and for portable electronic devices. Vehicles and portable electronic devices incorporating the electricity storage device according to the present invention are characterized in that the electricity storage device has a light weight, and that they have a large output power and excellent cyclic characteristics. Therefore, a light weight is particularly achieved which has been difficult to achieve with any electricity storage device, employing a conventional inorganic compound in terms of weight.

The present embodiment illustrates a case where the electricity storage material according to the present invention is used for an electricity storage device, and more specifically a lithium secondary battery. However, other than secondary batteries, the electricity storage material according to the present invention may be used in electric double layer capacitors and the like as described above, and can also be suitably used in electrochemical elements such as biochips utilizing biochemical reactions, and electrodes for use in electrochemical elements.

In this case, an electrode in which the aforementioned electricity storage material is used can be produced by three methods: a dry technique, a wet technique, and a vapor phase technique. First, an electrode production method by the dry technique will be described. Under the dry technique, the aforementioned copolymer compound is mixed with a binder agent, and the resultant paste is crimped onto an electrically conductive support. As a result, an electrode in which the electricity storage material in film shape is crimped onto the electrically conductive support is obtained. Although the film shape may be a dense film or a porous film, it is commonplace for a film by the dry technique to become porous.

As the binder agent, fluorine-type resins such as polyvinylidene fluoride, vinylidene fluoride-hexafluoropropylene copolymer, and vinylidene fluoride-polytetrafluoroethylene, or hydrocarbon-type resins such as polyethylene, polyimide, polyacrylic acid, and cellulose-type resin can be used. From a stability standpoint, preferably, fluoroplastic can be suitably used.

As the electrically conductive support, a metal substrate such as Al, SUS, gold, or silver, a semiconductor substrate such as Si, GaAs, or GaN, a transparent electrically conductive substrate such as ITO glass or $SnO_2$, a carbon substrate such as carbon or graphite, or an electrically conductive organic substrate such as polyaniline, polypyrrole, or polythiophene can be used.

The electrically conductive support may be a dense film of a film shape, or a porous film such as a net or a mesh, that is composed of any of the aforementioned material alone. Alternatively, a film of the aforementioned material for the electrically conductive support may be formed on plastic or glass, which is a non-electrically-conductive support. In addition to the copolymer compound and the binder agent, in order to assist in the electron conductivity within the film, an electrical conductivity assistant may be mixed as necessary, for example. As the electrical conductivity assistant, carbon materials such as carbon black, graphites, and acetylene black, or electrically conductive polymers such as polyaniline, polypyrrole, and polythiophene are used. Moreover, as an ion conductivity assistant, a solid electrolyte of polyethylene oxide or the like, or a gel electrolyte of polymethyl methacrylate or the like may be contained in the interior of the film.

Next, an electrode production method by the wet technique will be described. Under the wet technique, the aforementioned copolymer compound is mixed and dispersed in a solvent; the resultant slurry is applied or printed on an electrically conductive support; and the solvent is removed, whereby a film is formed. Similarly to the dry technique, an electrical conductivity assistant, a binder agent, and an ion conductivity assistant may be mixed in the electrode film as necessary. As the electrically conductive support, what is similar to those described with reference to the dry technique can be used.

Finally, an electrode production method by the vapor phase technique will be described. Under the vapor phase technique, the aforementioned copolymer compound is gasified in a vacuum; the copolymer compound in a gaseous state is deposited on an electrically conductive support, and film formation is performed, whereby a film is formed. As the film formation method for use in this method, commonly-used vacuum film formation processes such as a vacuum evaporation technique, a sputtering technique, and a CVD technique are applicable. Similarly to the dry technique, an electrical conductivity assistant, a binder agent, and an ion conductivity assistant may be mixed in the electrode film as necessary. As the electrically conductive support, what is similar to those described with reference to the dry technique can be used.

EXAMPLES

Hereinafter, results of synthesizing copolymer compounds represented by formula (6), producing electricity storage devices by using the same, and evaluating the characteristics of the electricity storage devices will be specifically described.

Prior to synthesis of copolymer compounds represented by formula (6), it was confirmed what would be a functional group having affinity with a nonaqueous solvent, which is preferable as a side chain of a second unit. Specifically, polymer compounds composed only of second units were subjected to a solvent affinity evaluation with respect to nonaqueous solvents. As polymer compounds composed only of second units, polymethylmethacrylate (PMMA) (manufactured by Aldrich Co., Mw=120000), polymethylacrylate (PMA) (manufactured by Aldrich Co., Mw=40000), polyvinyl acetate (PVAc) (manufactured by Aldrich Co., Mw=83000) having an oxygen-containing functional group, polystyrene (PS) (manufactured by Aldrich Co., Mw=290000) having a functional group composed of carbon, and polyacrylonitrile (PAN) (manufactured by Aldrich Co., Mw=150000) having a nitrile group, which is a nitrogen-containing group, were used. As electrolytic solvents, i.e., nonaqueous solvents, propylene carbonate (PC), diethyl carbonate (DEC), and N,N-dimethylformamide (DMF) were used.

The solvent affinity was evaluated by adding 10 mg of the compound in 20 g of the solvent, performing an ultrasonic agitation for 5 minutes, and thereafter measuring a grain size distribution within the solvent. The grain size distribution within the solvent was measured by using SALD-7000 manufactured by Shimadzu Corporation. In the grain size distribution measurement, dissolution was established when no diffraction/scatter intensity was observed and no grains of 0.015 μm or more existed in the nonaqueous solvent, and dissolution was not established when grains of 0.015 μm or more existed. When dissolution was established, a UV measurement was performed to confirm that the compound had dissolved in the solvent.

The results of the solvent affinity evaluation of the respective polymers with respect to electrolytic solvents are shown in Table 1.

TABLE 1

| | polymer compound composed of second units | | | | |
|---|---|---|---|---|---|
| | PMMA | PMA | PVAc | PS | PAN |
| solvent in which it dissolved | PC DEC DMF | PC DEC DMF | PC DEC DMF | DEC | DMF |

As shown in Table 1, PMMA, PMA, and PVAc dissolved in all of the nonaqueous solvents, thus having affinity therewith. Moreover, PS dissolved in DEC, and PAN dissolved in DMF, thus having an affinity.

It is estimated from these results that, when PMA or PVAc is used as the second units, similar effects to those when PMMA is used as the second units can be obtained. Moreover, it is estimated that a solvent affinity improvement is obtained with PS over DEC, and with PAN over DMF.

It is presumable from these results that the followings are suitable as the functional group having affinity with a nonaqueous solvent, to be contained in the side chains of the second units of the copolymer compound: an ester group, an ether group, and an carbonyl group, which are oxygen-containing groups; a cyano group, a nitro group, and a nitroxyl group, which are nitrogen-containing groups; an alkyl group and a phenyl group, which are functional groups composed of carbon; and an alkylthio group, a sulfone group, and a sulfoxide group, which are sulfur-containing groups.

Next, evaluation results of electricity storage devices having copolymer compounds represented by formula (6) will be described. Hereinafter, the evaluation results will be described in the order of: the evaluations of electrolytic solvent dependences of charge-discharge capacity, evaluations of charging and discharging cyclic characteristics, and evaluations of output characteristics, of the produced electricity storage devices.

First, the electrolytic solvent dependences of charge-discharge capacity of copolymer compounds according to the present invention will be described.

Example 1

1. Production of Specimen

First, copolymer compound A having the structure represented by formula (6) was synthesized. A constituent ratio m/n of the number m of second units (units including oxidation-reduction sites) to the number n of first units (units including oxidation-reduction sites) of copolymer compound A to be synthesized was approximately 1. Copolymer compound A was synthesized in split steps: synthesis of a tetrathiafulvalene precursor contained in the side chains, synthesis of copolymer main-chain compound A', and coupling of tetrathiafulvalene to copolymer main-chain compound A'. These will be described in order below.

Synthesis of the tetrathiafulvalene precursor was conducted by a route represented by formula (11) below. In a flask, 5 g of tetrathiafulvalene 17 (manufactured by Aldrich Co.) was placed, and 80 cc of tetrahydrofuran (manufactured by Aldrich Co.) was further added. After cooling this to −78° C., an n-hexane-tetrahydrofuran solution of 1 molarity of lithium diisopropylamide (manufactured by KANTO CHEMICAL CO.) was added dropwise over 10 minutes, and thereafter 7.3 g of paraformaldehyde (manufactured by KANTO CHEMICAL CO.) was added, and through 15 hours of agitation, reaction was allowed to progress. The solution obtained in this manner was poured into 900 cc of water, twice extracted with 1 L of diethyl ether (manufactured by KANTO CHEMICAL CO.), and after being cleaned with 500 cc of saturated aqueous solution of ammonium chloride and 500 cc of saturated brine, dried on anhydrous sodium sulfate. After the drying agent was removed, concentration under a reduced pressure was conducted, and 6.7 g of the resultant coarse matter was subjected to silica gel column purification, thus obtaining 1.7 g of purified matter. It was confirmed with NMR and IR that the purified matter was tetrathiafulvalene precursor 18.

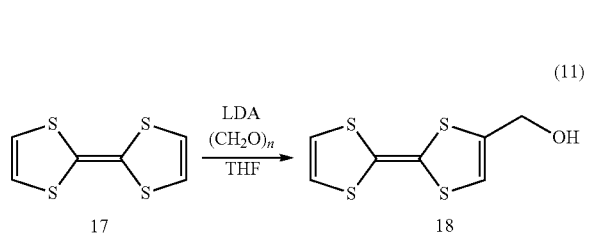 [SMILES: C1=CSC(=C2SC=CS2)S1 ; OCC1=CSC(=C2SC=CS2)S1 ; "THF"]

(11)

Synthesis of copolymer main-chain compound A' was conducted by a route represented by formula (12). As a monomer raw material, 40 g of methylmethacrylate (manufactured by Aldrich Co.) and 21 g of methacryloyl chloride (manufactured by Aldrich Co.) were mixed to 90 g of toluene (manufactured by Aldrich Co.), and 4 g of azoisobutyronitrile (manufactured by Aldrich Co.) was added as a polymerization initiator. Reaction was allowed to progress by agitating the mixture at 100° C. for 4 hours. By adding hexane to the solution obtained in this manner, reprecipitation was allowed to occur, whereby 57 g of precipitate product was obtained. It was confirmed with NMR(H-NMR), IR, and GPC that the product was copolymer main-chain compound A' represented by formula (21).

From an H-NMR measurement, the constituent ratio (m/n) of the second units to the first units was confirmed to be approximately 1. The H-NMR measurement results were analyzed in the following manner. In the H-NMR measurement, a peak associated with the hydrogens of methyl groups, which are attached one-for-each to the main chains of a first unit and a second unit and a peak associated with the hydrogens of a methyl group which is bound to a side chain of a second unit can be observed with distinction. Therefore, from a ratio between the integral values of the respective peaks in the resultant NMR spectrum, a proportion of the second units in the copolymer main-chain compound A' can be determined, whereby the constituent ratio (m/n) of the second units to the first units can be calculated. For example, when copolymer main-chain compound A' used in the present Example is measured in an H-NMR measurement in a chloroform solvent, a peak associated with the hydrogens of the methyl groups respectively bound to the main chains of each first unit and each second unit can be observed in the neighborhood of 0.5 to 2.2 ppm, and a peak associated with the hydrogens of the methyl group bound to the side chain of each second unit can be observed in the neighborhood of 3.6 ppm, and from a ratio between the integral values of these NMR spectrum peaks, a constituent ratio between the first units and the second units of synthesized copolymer main-chain compound A' can be calculated.

From an IR measurement, it was confirmed that both first units and second units had been introduced, i.e., first units and second units had copolymerized. In the IR measurement, carbonyl groups (C=O) of the first unit side chains near 1800 cm$^{-1}$ and carbonyl groups of the second unit side chains near 1750 cm$^{-1}$ were measurable as distinct peaks, whereby it was confirmed that the copolymer main-chain compound had resulted from copolymerization of the first units and the second units.

It was confirmed that copolymer main-chain compound A' synthesized from GPC had a molecular weight of 10000, and a degree of polymerization exceeding 20.

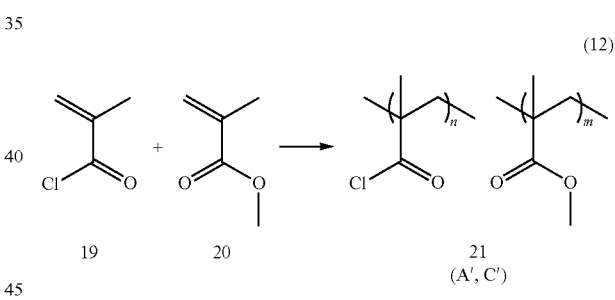

(12)

Coupling of the tetrathiafulvalene precursor 18 to copolymer main-chain compound A' was effected by a route represented by formula (13) below. Under an Ar gas flow, 1.0 g of tetrathiafulvalene precursor 18 and 26 cc of tetrahydrofuran were placed in a reaction vessel, and agitated at room temperature. To the reaction solution, 0.17 g of NaH (60 wt % in mineral oil) (manufactured by Aldrich Co.) was added dropwise, and while this was agitated at 40° C. for 1 hour, a solution in which 0.58 g of copolymer main-chain compound A' had been dissolved in 8.5 cc of tetrahydrofuran was mixed. Reaction was allowed to progress by agitating the mixed solution at 70° C. overnight. Hexane was added to the solution obtained in this manner, and 0.2 g of precipitate product was obtained through reprecipitation. It was confirmed with NMR, IR, GPC, and element analysis (sulfur) that the resultant product was copolymer compound A.

From an H-NMR measurement, the constituent ratio (m/n) of the second units to the first units was confirmed to be approximately 1. The H-NMR measurement results were analyzed in the following manner. By using H-NMR measurement, the followings can be observed at different peaks:

the hydrogens of the methylene group that bonds tetrathiafulvalene, which is an oxidation-reduction site of copolymer compound A, to the main chain; hydrogens other than the binding portions of tetrathiafulvalene to the main chain; and hydrogens of the methyl groups bound to the side chains of the second units. Therefore, from the ratio between the integral values of the respective peaks of the resultant NMP spectrum, the proportions of the first units and the second units of the copolymer compound are obtained, and the constituent ratio (m/n) of the second units to the first units can be calculated. For example, in an H-NMR measurement in a chloroform solvent, a peak associated with the hydrogens of the methylene group bonding tetrathiafulvalene to the main chain can be observed near 4.8 ppm; a peak associated with hydrogens other than the binding portions of tetrathiafulvalene to the main chain can be observed near 6.8 to 7.0 ppm; and a peak associated with the hydrogens of the methyl groups bound to the side chains of the second units can be observed near 3.6 ppm, and from a ratio between the integral values of these NMR spectrum peaks, the constituent ratio between the first units and the second units of synthesized copolymer main-chain compound A' can be calculated. Note that, for the constituent ratio in the present Example, a value is used which is calculated, from integral values of a peak associated with the first units and a peak associated with the methyl groups bound to the second unit side chains, in an H-NMR measurement of copolymer compound A after the step of introducing TTF.

From an IR measurement, it was confirmed that the first units having an oxidation-reduction site introduced thereto and the second units had copolymerized. In the IR measurement, a peak associated with carbonyl groups (C=O) of the first unit side chains was measured near 1800 cm$^{-1}$, and the peak near 1800 cm$^{-1}$ had disappeared, whereby it was confirmed that TTF had been introduced to the first units of the copolymer main-chain compound. Moreover, a peak associated with carbonyl groups of the second unit side chains was measured near 1750 cm$^{-1}$, and by confirming disappearance of the peak near 1800 cm$^{-1}$ and confirming a peak near 1750 cm$^{-1}$, it was confirmed that the first units having an oxidation-reduction site introduced thereto and the second units had copolymerized.

From a GPC measurement, it was confirmed that synthesized copolymer compound A had a weight-average molecular weight of approximately 28000.

An element analysis with respect to sulfur was conducted, which indicated that synthesized copolymer compound A had a sulfur content of 16.7 wt %, whereby it was confirmed that TTF had been introduced to the side chains.

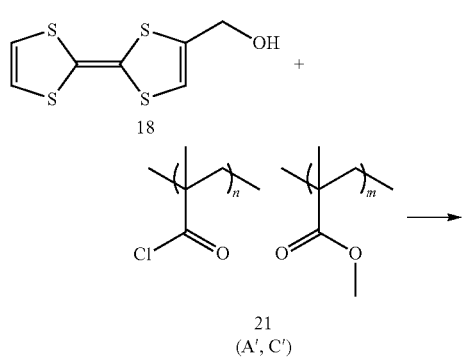

(13)

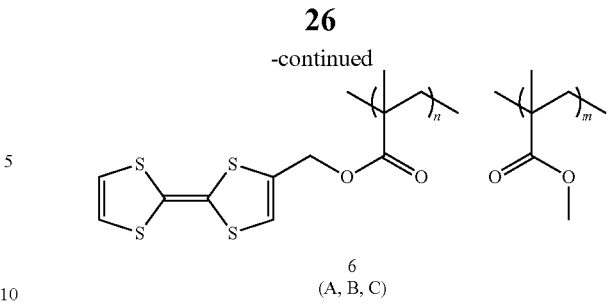

(A, B, C)

2. Production of Electricity Storage Device

By using copolymer compound A thus synthesized, an electricity storage device was produced. Before being mixed, copolymer compound A was crushed in a mortar for use. After being crushed in the mortar, copolymer compound A had a particle diameter of approximately 10 μm. To 37.5 mg of copolymer compound A, 100 mg of acetylene black was added as an electrical conductivity agent, and these were mixed; furthermore, 25 mg of polytetrafluoroethylene was added as a binder and mixed, whereby a positive-electrode active substance mixture was obtained. Furthermore, this positive electrode mixture was crimped onto an aluminum grid, subjected to vacuum drying, and was cut by stamping into a disk shape with a diameter of 13.5 mm, thus producing a positive electrode plate. The applied weight of the positive-electrode active substance was 1.7 mg/cm$^2$ per unit area of electrode plate.

Metal lithium (thickness: 300 μm) as a negative-electrode active substance was stamped into a disk shape having a diameter of 15 mm, and was attached onto a current collector plate (made of stainless steel) of a disk shape also having a diameter of 15 mm, thus producing a negative electrode.

By using a solvent in which ethylene carbonate (EC) and propylene carbonate (PC) were mixed at a volume ratio of 1:1, and dissolving lithium hexafluorophosphate therein at a concentration of 1 mol/L as a salt, an electrolyte solution was produced. The solvent used had a relative dielectric constant of 78. Note that the electrolyte solution was used in a form permeating the positive electrode, the negative electrode, and a porous polyethylene sheet (thickness: 20 μm).

The positive electrode, the negative electrode, and the electrolyte solution were accommodated in a case of a coin-type battery shown in FIG. 1; an opening of the case was pinched with a sealing plate having a gasket mounted thereon; and this was crimp sealed by a press machine, whereby a coin-type electricity storage device was obtained.

Example 2

An electricity storage device was produced by employing similar conditions to those in Example 1 except for the composition of the electrolyte solution. The electrolyte solution was produced by using propylene carbonate (PC) as a solvent, and dissolving lithium hexafluorophosphate therein at a concentration of a 1 mol/L. The solvent used had a relative dielectric constant of 65.

Example 3

An electricity storage device was produced by employing similar conditions to those in Example 1 except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 12:1. The solvent used had a relative dielectric constant of 60.

Example 4

An electricity storage device was produced by employing similar conditions to those in Example 1 except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 3.2:1. The solvent used had a relative dielectric constant of 50.

Example 5

An electricity storage device was produced by employing similar conditions to those in Example 1 except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 1.5:1. The solvent used had a relative dielectric constant of 40.

Example 6

An electricity storage device was produced by employing similar conditions to those in Example 1 except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 0.8:1. The solvent used had a relative dielectric constant of 30.

Example 7

1. Production of Specimen

Copolymer compound B having the structure represented by formula (6) was synthesized. The constituent ratio m/n of the number m of second units to the number n of first units composing copolymer compound B to be synthesized is approximately 1. Copolymer compound B was synthesized in split steps: synthesis of a tetrathiafulvalene precursor contained in the side chains, synthesis of a copolymer main-chain compound, and coupling of tetrathiafulvalene to the copolymer main-chain compound.

Synthesis of copolymer compound B employed copolymer main-chain compound A' produced according to Example 1, and was conducted in a similar manner to Example 1 except for the conditions of coupling tetrathiafulvalene to copolymer main-chain compound A'. Specifically, with respect to a reaction between a reaction solution of tetrathiafulvalene precursor 18, tetrahydrofuran, and NaH (60 wt % in mineral oil) and a reaction solution of copolymer main-chain compound A' and tetrahydrofuran, the reaction was allowed to progress through agitation at 80° C. for 1 hour.

It was confirmed with H-NMR, IR, GPC, and element analysis (sulfur) that the resultant product was copolymer compound B. From H-NMR, the constituent ratio m/n of the second units to the first units of copolymer compound B was confirmed to be approximately 1. Synthesized copolymer compound B had a weight-average molecular weight of approximately 19000. As a result of sulfur element analysis of synthesized copolymer compound B, the sulfur content was found to be 30.2 wt %.

2. Production of Electricity Storage Device

By using copolymer compound B synthesized as above as the positive-electrode active substance, an electricity storage device was produced similarly to Example 1.

Example 8

By using copolymer compound B as the positive-electrode active substance, an electricity storage device was produced similarly to Example 4. The solvent used had a relative dielectric constant of 50.

Example 9

By using copolymer compound B as the positive-electrode active substance, an electricity storage device was produced similarly to Example 6. The solvent used had a relative dielectric constant of 30.

Example 10

1. Production of Specimen

Copolymer compound C having the structure represented by formula (6) was synthesized. The constituent ratio m/n of the number m of second units to the number n of first units composing copolymer compound C was approximately 5. Copolymer compound C was synthesized in split steps: synthesis of a tetrathiafulvalene precursor contained in the side chains, synthesis of copolymer main-chain compound C', and coupling of tetrathiafulvalene to copolymer main-chain compound C'. These will be described in order below.

Synthesis of tetrathiafulvalene precursor 18 was conducted similarly to Example 1.

Synthesis of copolymer main-chain compound C' was conducted by a route represented by formula (12). As a monomer raw material, 50 g of methylmethacrylate (manufactured by Aldrich Co.) and 10.5 g of methacryloyl chloride (manufactured by Aldrich Co.) were mixed to 24 g of toluene (manufactured by Aldrich Co.), and 3.9 g of azoisobutyronitrile (manufactured by Aldrich Co.) was added as a polymerization initiator. Reaction was allowed to progress by agitating the mixture at 100° C. for 4 hours. Hexane was added to the solution obtained in this manner, and 54 g of precipitate product was obtained through reprecipitation. It was confirmed with H-NMR, IR, and GPC that the product was copolymer main-chain compound C', which is a copolymer compound represented by formula (21).

Coupling of tetrathiafulvalene precursor 18 to copolymer main-chain compound C' was effected by a route represented by formula (11). Under an Ar gas flow, 1.96 g of tetrathiafulvalene precursor 18 and 51 cc of tetrahydrofuran were placed in a reaction vessel, and agitated at room temperature. To the reaction solution, 0.335 g of NaH (60 wt % in mineral oil) (manufactured by Aldrich Co.) was added dropwise over 30 minutes, and while this was agitated at 40° C. for 1 hour, a solution in which 2.5 g of copolymer main-chain compound C' had been dissolved in 3.9 cc of tetrahydrofuran was mixed. Reaction was allowed to progress by agitating the mixed solution at 80° C. overnight. The solution obtained in this manner was concentrated, and after the resultant solid was placed in 50 cc of water and agitated, it was filtrated. The resultant solid was placed in 50 cc of methanol and agitated, and subjected to filtration. The resultant solid was cleaned with hexane, and after being cleaned with methanol, dried under reduced pressure at 40° C. for 5 hours, thus obtaining 1.9 g of product. It was confirmed with H-NMR, IR, and GPC that the resultant product was copolymer compound C. From H-NMR, the constituent ratio m/n of the second units to the first units of copolymer compound C was confirmed to be approximately 5. Synthesized copolymer compound C had a weight-average molecular weight of approximately 18000. As a result of sulfur element analysis of synthesized copolymer compound C, the sulfur content was found to be 14.3 wt %.

2. Production of Electricity Storage Device

By using copolymer compound C as the positive-electrode active substance, an electricity storage device was produced similarly to Example 1.

Example 11

By using copolymer compound C as the positive-electrode active substance, an electricity storage device was produced similarly to Example 4. The solvent used had a relative dielectric constant of 50.

Example 12

By using copolymer compound C as the positive-electrode active substance, an electricity storage device was produced similarly to Example 6. The solvent used had a relative dielectric constant of 30.

Comparative Example 1

By using polymer compound 8 as the positive-electrode active substance, an electricity storage device was produced under the same conditions as those in Example 1. Polymer compound 8 was synthesized by allowing polyvinyl alcohol and tetrathiafulvalene carboxyl derivative to react through dehydration condensation. Polymer compound 8 being used had a weight-average molecular weight of approximately 50000. As the electrolyte solution, one having the same composition as that in the first example was used. The solvent used had a relative dielectric constant of 78.

Comparative Example 2

By using polymer compound 8 as the positive-electrode active substance, an electricity storage device was produced under the same conditions as those in Example 2. The solvent used had a relative dielectric constant of 65.

Comparative Example 3

By using polymer compound 8 as the positive-electrode active substance, an electricity storage device was produced under the same conditions as those in Example 3. The solvent used had a relative dielectric constant of 60.

Comparative Example 4

By using polymer compound 8 as the positive-electrode active substance, an electricity storage device was produced under the same conditions as those in Example 1, except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 5:1. The solvent used had a relative dielectric constant of 55.

Comparative Example 5

By using polymer compound 8 as the positive-electrode active substance, an electricity storage device was produced under the same conditions as those in Example 4. The solvent used had a relative dielectric constant of 50.

Comparative Example 6

By using polymer compound 8 as the positive-electrode active substance, an electricity storage device was produced under the same conditions as those in Example 5. The solvent used had a relative dielectric constant of 40.

Comparative Example 7

By using polymer compound 8 as the positive-electrode active substance, an electricity storage device was produced under the same conditions as those in Example 1, except for the composition of the electrolyte solution. The electrolyte solution was produced by dissolving lithium hexafluorophosphate at a concentration of 1 mol/L in a solvent in which propylene carbonate (PC) and diethyl carbonate (DEC) were mixed at a volume ratio of 1:1. The solvent used had a relative dielectric constant of 34.

Comparative Example 8

1. Production of Specimen

A polymer compound represented by formula (14) (hereinafter referred to as polymer compound 14) was synthesized. Polymer compound 14 is a polymer compound which lacks the second units in the copolymer compound represented by formula (4), but is composed only of the first units having an oxidation-reduction site. Polymer compound 14 was synthesized in split steps: synthesis of a tetrathiafulvalene precursor contained in the side chains, synthesis of a polymer main-chain compound, and coupling of tetrathiafulvalene to the polymer main-chain compound. These will be described in order below.

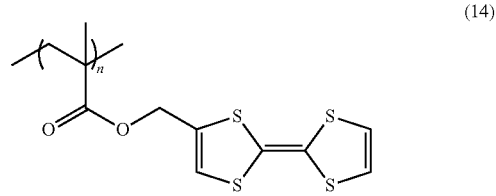

(14)

Synthesis of tetrathiafulvalene precursor 18 was conducted similarly to Example 1.

Synthesis of the polymer main-chain compound was conducted by a route represented by formula (15) below. As a monomer raw material, 50 g of methacryloyl chloride (manufactured by Aldrich Co.) was mixed in 24 g of toluene (manufactured by Aldrich Co.), and 0.5 g of azoisobutyronitrile (manufactured by Aldrich Co.) was added as a polymerization initiator. Reaction was allowed to progress by agitating the mixture at 65° C. for 6 hours. It was confirmed with H-NMR, IR, and GPC that the product was a compound represented by formula (22) (hereinafter referred to as polymer main-chain compound 22).

(15)

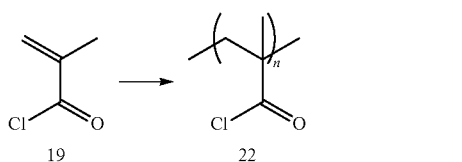

Coupling of tetrathiafulvalene precursor 18 to polymer main-chain compound 22 was effected by a route represented by formula (16). Under an Ar gas flow, 3.4 g of tetrathiafulvalene precursor 18 and 88 cc of tetrahydrofuran were placed in a reaction vessel, and agitated at room temperature. To the reaction solution, 0.574 g of NaH (60 wt % in mineral oil) (manufactured by Aldrich Co.) was added dropwise over 20 minutes, and while this was agitated at 40° C. for 1 hour, a solution in which 1.0 g of polymer main-chain compound 22 had been dissolved in 15 cc of tetrahydrofuran was mixed. Reaction was allowed to progress by agitating the mixed solution at 80° C. overnight. The solution obtained in this manner was concentrated, and after placing 50 cc of water in the resultant solid and agitating it, filtration was conducted, and the resultant solid was placed in 50 cc of methanol and agitated, and subjected to filtration. The resultant solid was cleaned with hexane, and after being cleaned with methanol, dried under reduced pressure at 40° C. for 5 hours, thus obtaining 2.2 g of product. It was confirmed with H-NMR, IR, GPC, and element analysis (sulfur) that the resultant product was polymer compound 14. Synthesize polymer compound 14 had a weight-average molecular weight of approximately 44000. As a result of sulfur element analysis of synthesized polymer compound 14, the sulfur content was found to be 38.9 wt %.

(16)

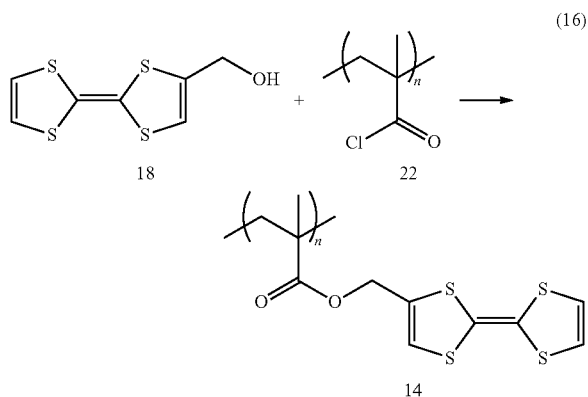

2. Production of Electricity Storage Device

By using polymer compound 14 as the positive-electrode active substance, an electricity storage device was produced similarly to Example 1. The solvent used had a relative dielectric constant of 78.

Comparative Example 9

By using polymer compound 14 as the positive-electrode active substance, an electricity storage device was produced under the same conditions as those in Example 2. The solvent used had a relative dielectric constant of 65.

Comparative Example 10

By using polymer compound 14 as the positive-electrode active substance, an electricity storage device was produced under the same conditions as those in Example 4. The solvent used had a relative dielectric constant of 50.

Comparative Example 11

A positive electrode and a negative electrode were produced as follows. As a positive electrode and negative-electrode active substance, activated carbon powder (specific surface 1700 m²/g, average particle diameter: 2 μm) was used to produce the positive electrode and the negative electrode. Activated carbon powder 100 mg and acetylene black 20 mg were homogeneously mixed, and polyvinylpyrrolidone 20 mg and methanol 800 mg were added, thus preparing a slurry. This slurry of positive electrode and negative electrode mixture was applied on an aluminum foil as a current collector, subjected to vacuum drying, and then cut by stamping into disk shapes having a diameter of 13.5 mm, thus obtaining the positive electrode and the negative electrode. The applied weight of the positive electrode and negative-electrode active substance was 2.0 mg/cm² per unit area of electrode plate.

Other than employing electrodes using activated carbon powder as the positive electrode and the negative electrode, an electricity storage device was produced under similar conditions to those in Example 1.

Comparative Example 12

By employing similar conditions to those in Comparative Example 11 except for the composition of the electrolyte solution, an electricity storage device was produced. The electrolyte solution was produced by dissolving lithium hexafluorophosphate at a concentration of 1 mol/L in a solvent in which propylene carbonate (PC) and diethyl carbonate (DEC) were mixed at a volume ratio of 0.8:1. The solvent used had a relative dielectric constant of 30.

3. Evaluation of Characteristics of Electricity Storage Devices

Charge-discharge capacities of the electricity storage devices of Examples 1 to 12 and Comparative Examples 1 to 12 were evaluated. The charge-discharge capacity evaluation of each electricity storage device was made based on a value obtained by dividing a charge-discharge capacity at the initial charging and discharging by the active substance weight, i.e., charge-discharge capacity per unit weight of active substance. The charging and discharging was performed via 0.1 mA constant-current charging and discharging. The charging and discharging conditions were as follows: Examples 1 to 12 and Comparative Examples 1 to 10 had a charge upper limit voltage of 4.0 V and a discharge lower limit voltage of 3.0 V; Comparative Examples 11 and 12 had a charge upper limit voltage of 2 V and a discharge lower limit voltage of 0 V. The downtime after finishing charging and before beginning discharging was zero.

Figure 3:
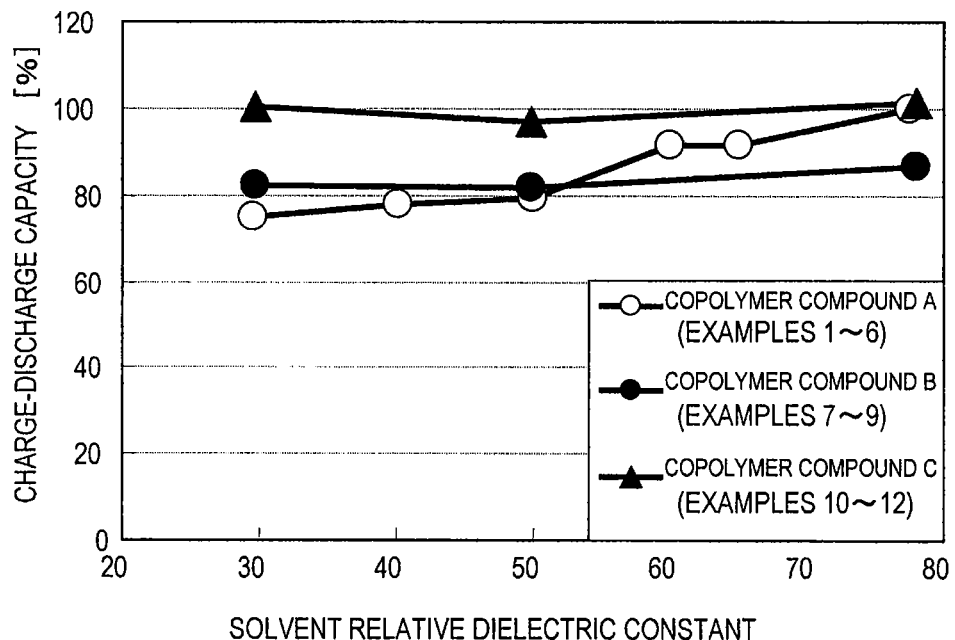
FIG. 3 A graph showing evaluation results of Examples 1 to 12.
Figure 4:
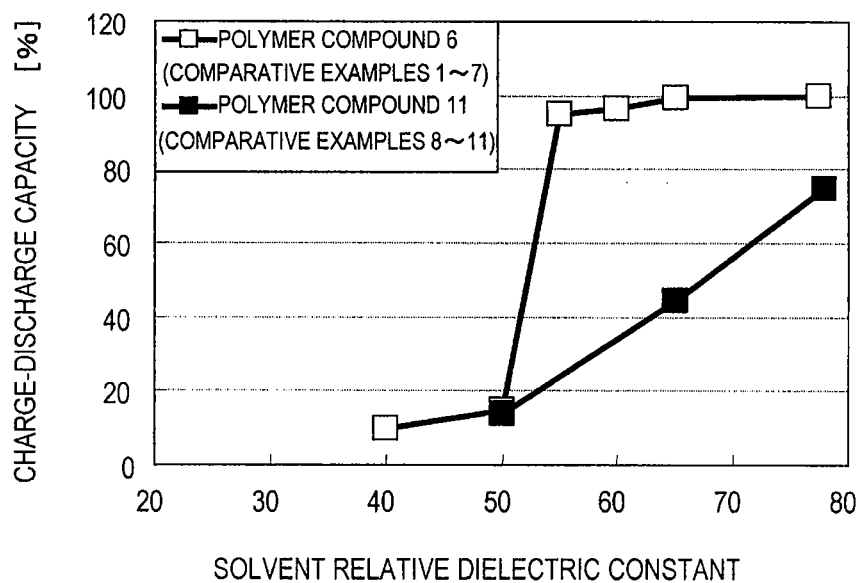
FIG. 4 A graph showing evaluation results of Comparative Examples 1 to 12.

The charge-discharge capacity evaluation results of the electricity storage devices of Examples 1 to 12 are comprehensively shown in Table 2, and the charge-discharge capacity evaluation results of Comparative Examples 1 to 12 are comprehensively shown in Table 3. Moreover, the results of Table 2 and Table 3 are shown in FIG. 3 and FIG. 4. In FIG. 3 and FIG. 4, the vertical axis represents a proportion of a measured charge-discharge capacity value relative to a design capacity.

TABLE 2

| | positive-electrode active substance | relative dielectric constant | charge-discharge capacity [mAh/g] | charge-discharge capacity rate [% VS. stoichiometric capacity] |
|---|---|---|---|---|
| Example 1 | copolymer compound A (m/n = 1) | 78 | 69 | 99 |
| Example 2 | | 65 | 63 | 90 |
| Example 3 | | 60 | 63 | 90 |
| Example 4 | | 50 | 55 | 79 |
| Example 5 | | 40 | 53 | 76 |
| Example 6 | | 30 | 52 | 74 |
| Example 7 | copolymer compound B (m/n = 1) | 78 | 109 | 87 |
| Example 8 | | 50 | 102 | 82 |
| Example 9 | | 30 | 103 | 82 |
| Example 10 | copolymer compound C (m/n = 5) | 78 | 60 | 100 |
| Example 11 | | 50 | 58 | 97 |
| Example 12 | | 30 | 60 | 100 |

TABLE 3

| | positive-electrode active substance | relative dielectric constant | charge-discharge capacity [mAh/g] | charge-discharge capacity rate [% VS. stoichiometric capacity] |
|---|---|---|---|---|
| Comparative Example 1 | polymer compound 8 | 78 | 188 | 96 |
| Comparative Example 2 | | 65 | 187 | 95 |
| Comparative Example 3 | | 60 | 181 | 92 |
| Comparative Example 4 | | 55 | 178 | 91 |
| Comparative Example 5 | | 50 | 28 | 14 |
| Comparative Example 6 | | 40 | 19 | 10 |
| Comparative Example 7 | | 34 | 15 | 8 |
| Comparative Example 8 | polymer compound 14 | 78 | 132 | 75 |
| Comparative Example 9 | | 65 | 78 | 44 |
| Comparative Example 10 | | 50 | 24 | 15 |
| Comparative Example 11 | activated carbon | 78 | 42 | 100 |
| Comparative Example 12 | | 30 | 41 | 98 |

As is clear from Table 2 and FIG. 3, the electricity storage devices of Examples 1 to 6, in which copolymer compound A (m/n=1) according to the present invention was used, each attained a charge-discharge capacity of 50 mAh/g or more in a broad range, from 30 to 78, of relative dielectric constant of the solvent of the electrolyte solution. However, it can be seen that the charge-discharge capacity increases as the relative dielectric constant of the electrolytic solvent increases. Since copolymer compound A (formula (4)) used in Examples 1 to 6 had a sulfur content of 16.7 wt %, the stoichiometric capacity of copolymer compound A is calculated from the sulfur content to be 70 mAh/g. The stoichiometric capacity calculation can be made based on the assumption that all sulfur in the copolymer compound is ascribable to the tetrathiafulvalene structure, which contains four sulfur elements, and that the tetrathiafulvalene structure enables a two-electron oxidation/reduction per structure. The charge-discharge capacity of Example 1 is 99% of the stoichiometric capacity.

In Example 6, in which the relative dielectric constant of the electrolytic solvent is as low as 30, a charge-discharge capacity that is 74% of the stoichiometric capacity is achieved.

Also in Examples 7 to 9, in which copolymer compound B (m/n=1) according to the present invention was used, a charge-discharge capacity of 100 mAh/g or more was obtained in a broad range, from 30 to 78, of relative dielectric constant of the solvent of the electrolyte solution. Copolymer compound B used in Examples 7 to 9 is identical to copolymer compound A used in Examples 1 to 6 in terms of the constituent ratio between the first units and the second units, but differs in terms of the conditions of effecting the coupling of the tetrathiafulvalene sites to the main chain. As a result, the proportion of coupling of the tetrathiafulvalene sites to the main chain is different, and thus the sulfur content of the copolymer compound is different. Since the sulfur content in copolymer compound B used for Examples 7 to 9 was 30.2 wt %, the stoichiometric capacity is calculated from the sulfur content to be 125 mAh/g. The charge-discharge capacity of Example 7 is 87% of the stoichiometric capacity. Moreover, a charge-discharge capacity that is 82% of the stoichiometric capacity is achieved in Example 9, in which the relative dielectric constant of the electrolytic solvent is as low as 30. This indicates that, when copolymer compound B is used, a relatively high charge-discharge capacity is achieved regardless of the relative dielectric constant of the electrolytic solvent.

Also in Examples 10 to 12, in which copolymer compound C (m/n=5) according to the present invention was used, a charge-discharge capacity of 50 mAh/g or more was obtained regardless of the relative dielectric constant of the electrolytic solvent. Since the sulfur content of copolymer compound C used in Examples 10 to 12 was 14.3 wt %, the stoichiometric capacity is calculated from the sulfur content to be 60 mAh/g. The charge-discharge capacity of Example 10 is the same capacity as the stoichiometric capacity, and the same charge-discharge capacity as the stoichiometric capacity is also achieved in Example 12, in which the relative dielectric constant of the electrolytic solvent is as low as 30.

Figure 6:
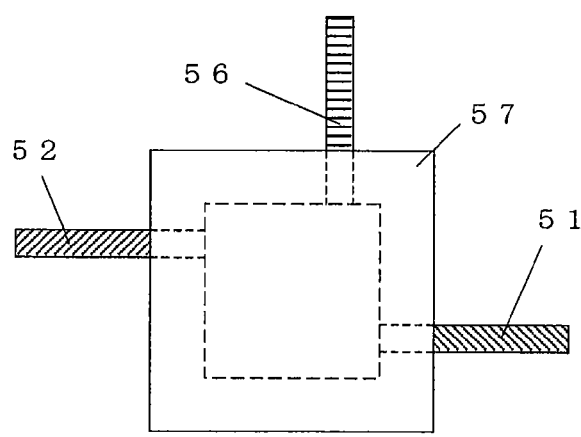
FIG. 6 A schematic upper plan view of the secondary battery in FIG. 5.

On the other hand, as shown in Table 3 and FIG. 6, when polymer compound 8 was used as the active substance, a large charge-discharge capacity was obtained only when the relative dielectric constant of the electrolytic solvent was 55 or more, and the charge-discharge capacity was remarkably small with solvents having any relative dielectric constant less than 55.

In the case where polymer compound 11 was used, a charge-discharge capacity of 132 mA/g, i.e., 75% of the designed capacity, was confirmed when the relative dielectric constant of the electrolytic solvent was 78, but it was a slightly lower 78 mAh/g, i.e., about 45% of the designed capacity, when the relative dielectric constant of the electrolytic solvent was 65, and the capacity was greatly lowered to 24 mAh/g, i.e., 15% of the design capacity, when the relative dielectric constant of the electrolytic solvent was 50.

When activated carbon was used as the positive-electrode active substance, regardless of the type of the electrolytic solvent, a capacity of 41 mAh/g or more, which is substantially the stoichiometric capacity, was confirmed.

The presumable reason is that, since polymer compound 8 and polymer compound 11 lack second units having side chains which do not undergo oxidation-reduction reactions, the solvent cannot come very close to the side chains, so that the solvation effects for the oxidation-reduction sites are reduced as the relative dielectric constant of the solvent decreases. Therefore, when a solvent having a small relative dielectric constant is used, paths for solvent molecules and anions to move are not secured within the active substance. As a result, only a capacity which is much lower than the designed capacity can be obtained.

Note that the reason why the charge-discharge capacity is greater in Comparative Examples 1 to 4 and Comparative Example 8 than in Examples 1 to 12 is that, since polymer compound 8 and polymer compound 11 being used in Comparative Examples 1 to 4 and Comparative Example 8 lack second units, the number of oxidation-reduction sites per unit weight is greater than in copolymer compounds A, B, and C.

Thus, by using a copolymer compound in which units having an oxidation-reduction group and units lacking oxidation-reduction groups were copolymerized, as in the structure represented by formula (4) according to the present invention, devices capable of providing a capacity which is in accordance with the designed capacity were obtained, regardless of the electrolytic solvent type. Moreover, as demonstrated by Examples 1 to 12, electricity storage devices in which a copolymer compound whose constituent ratio was greater than 0 and equal to or less than 5 was used as the positive-electrode active substance were confirmed to have a capacity of 52 mAh/g or more, thus obtaining a greater capacity than those of the activated carbon demonstrated by Comparative Examples 11 and 12. Note that, the oxidation-reduction potential of the copolymer compound according to the present invention was in a range from 3 to 4 V, and high-capacity electricity storage devices capable of providing a capacity in accordance with a design capacity regardless of the electrolyte solution type were obtained.

Next, cyclic characteristics of the copolymer compound according to the present invention and an output characteristics test will be described.

Example 13

1. Production of Specimen

Copolymer compound B used in Example 7, whose constituent ratio (m/n) of the second units to the first units was approximately 1, was employed.

2. Production of Electricity Storage Device

A positive electrode plate was produced under similar conditions to those in Example 1, except that copolymer compound B synthesized as above was used as the positive-electrode active substance and that the positive electrode plate produced had a 15 mm square shape.

A negative electrode was produced as follows. By using activated carbon powder (specific surface 1700 m2/g, average particle diameter: 2 µm) as the negative-electrode active substance, a negative electrode was produced. One hundred mg of activated carbon powder and 20 mg of acetylene black were homogeneously mixed, and 20 mg of polyvinylpyrrolidone and 800 mg of methanol were added thereto, thus preparing a slurry. This slurry of negative electrode mixture was applied on an aluminum foil as a current collector, subjected to vacuum drying, and cut by stamping into a 15 mm square shape, thus obtaining the negative electrode. The applied weight of the negative-electrode active substance was 2.0 mg/cm² per unit area of electrode plate.

Next, a reference electrode was produced. By stamping metal lithium (thickness: 300 µm) into a 15 mm square shape, and attaching it onto a current collector plate (made of nickel) also having a 15 mm square shape, the reference electrode was produced.

By using a solvent in which ethylene carbonate (EC) and ethyl methyl carbonate (EMC) were mixed at a volume ratio of 1:3, and dissolving lithium hexafluorophosphate therein at a concentration of 1 mol/L as a salt, an electrolyte solution was produced. The solvent used had a relative dielectric constant of 28. Note that the electrolyte solution was used in a form permeating the positive electrode, the negative electrode, and a porous polyethylene sheet (thickness: 20 µm).

Figure 5:
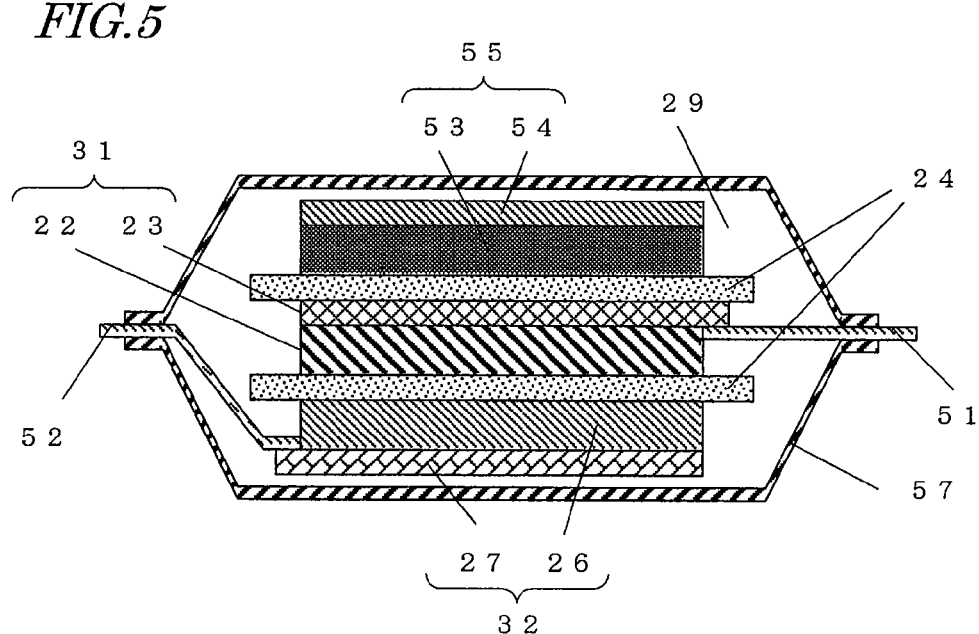
FIG. 5 A schematic cross-sectional view showing a laminate-type secondary battery as an Example of an electricity storage device according to the present invention.

By using the above positive electrode, negative electrode, reference electrode, and electrolyte solution, a laminate-type lithium secondary battery was produced. FIG. 5 and FIG. 6 show a schematic cross section and an upper face of the laminate-type lithium secondary battery produced.

As shown in FIG. 5, the laminate-type lithium secondary battery includes a positive electrode 31, a negative electrode 32, a reference electrode 55, and separators 24. As the positive electrode 31, one which is similar to that of a coin-type lithium secondary battery was used, with an positive electrode lead 51 being connect to an end thereof. As the positive electrode lead 51, one which is similar to the positive current collector 23 can be used. Likewise, as the negative electrode 32, one which is similar to that of a coin-type lithium secondary battery is used, with a negative electrode lead being connected to an end thereof, and as the negative electrode lead 52, one which is similar to the negative current collector 27 can be used.

The reference electrode 55 contains a reference-electrode substance 53. As the reference-electrode substance, metal lithium was used. The reference-electrode substance 53 is supported by a reference current collector 54. A mesh made of nickel was used as the reference current collector 54, whereas a nickel lead was used as the reference electrode lead 56. The reference electrode lead 56 is connected to an end of the reference current collector 54.

The positive electrode 31 and the negative electrode 32 oppose each other with the separators 24 interposed therebetween, such that the positive-electrode active substance layer 23 and the negative-electrode active substance layer 26 are in contact with the separators 24. The reference electrode 55 is disposed so that the reference-electrode substance 53 opposes the positive current collector 23 with a separator 24 interposed therebetween. As a result, the positive electrode 31, the negative electrode 32, and the reference electrode 55 constitute an electrode group. As the separators 24, those which are similar to that of a coin-type lithium secondary battery can be used. When constructing the electrode group, the electrodes are disposed so that the lead connected to each current collector is taken out in a different direction so as to prevent short-circuiting.

The electrode group is accommodated in the internal space of an aluminum laminate case 57. In the internal space of the aluminum laminate case 57, an electrolyte solution 29 is injected, so that the positive electrode 31, the negative electrode 32, the reference electrode 55, and the separators 24 are impregnated with the electrolyte solution 29. As the electrolyte solution 29, one which is similar to that of a coin-type lithium secondary battery can be used. Since the separators 24 include minute spaces for retaining the electrolyte solution 29, the electrolyte solution 29 is retained in the minute spaces, such that the electrolyte solution 29 is interposed between the positive electrode 31 and the negative electrode 32 and between the positive electrode 31 and the reference electrode 55. After disposing the electrode group in place and injecting an electrolyte solution, an aluminum laminate 57 was closed via heat-sealing, thus producing an electricity storage device.

Example 14

By using copolymer compound C as the positive-electrode active substance, an electricity storage device was produced similarly to Example 13. The solvent used had a relative dielectric constant of 28.

Comparative Example 13

By using polymer compound 14 as the positive-electrode active substance and employing similar conditions to those in Example 13 except for the composition of the electrolyte solution, an electricity storage device was produced. The electrolyte solution was produced by dissolving lithium hexafluorophosphate at a concentration of 1 mol/L in a solvent in which propylene carbonate (PC) and ethylene carbonate (EC) were mixed at a volume ratio of 1:1. The solvent used had a relative dielectric constant of 78.

1. Evaluation of Electricity Storage Device Characteristics

Charging and discharging cyclic characteristics of the electricity storage devices of Examples 13 and 14 and Comparative Example 13 were evaluated. The cyclic characteristics evaluation of each electricity storage device was made based on a value obtained by dividing a charge-discharge capacity after 500 cycles by a charge-discharge capacity at the $1^{st}$ cycle, i.e., a charge-discharge capacity retention rate after 500 cycles. The charging and discharging was performed via constant-current charging and discharging of 0.1 mA at the $1^{st}$ to $3^{rd}$ cycles and at the $498^{th}$ to $500^{th}$ cycles, and via constant-current charging and discharging of 5 mA for Example 13, 10 mA for Example 14, and 0.5 mA for Comparative Example 12 at the $4^{th}$ to $497^{th}$ cycle. The charging and discharging conditions were such that the positive electrode potential had an upper limit voltage of 4.0 V and a lower limit voltage of 3.0 V. As the positive electrode potential, a potential of the positive electrode relative to the reference electrode was used. By using the potential of the positive electrode relative to the reference electrode as the positive electrode potential, it becomes possible to observe only the deterioration behavior of the positive electrode, irrespective of any deterioration of the negative electrode, separators, and electrolyte solution composing the electricity storage device that is associated with repetitive charging and discharging. The downtime after finishing charging or discharging and before beginning discharging or charging was zero.

The charge-discharge capacities of Examples 13 and 14 and Comparative Example 13 at the $1^{st}$ cycle and the $500^{th}$ cycle are comprehensively shown in Table 4.

TABLE 4

| | positive-electrode active substance | initial capacity [mAh/g] | capacity retention rate [%] |
|---|---|---|---|
| Example 13 | copolymer compound B (m/n = 1) | 103 | 95.0 |
| Example 14 | copolymer compound C (m/n = 5) | 60 | 98.6 |
| Comparative Example 13 | polymer compound 14 | 132 | 56.9 |

Results of the cyclic characteristics test will be described. As shown in Table 4, in the electricity storage devices of Examples 13 and 14 in which the copolymer compound according to the present invention was used, the capacity retention rate up to the $500^{th}$ cycle was 95% or more. In the electricity storage device in which polymer compound 11 was used, the capacity retention rate at the $500^{th}$ cycle was 57%.

Copolymer compounds B and C (formula 4) used in the electricity storage devices of Examples 13 and 14 were copolymerization of units including an oxidation-reduction reaction site in their side chains and units lacking oxidation-reduction reaction sites in their side chains. Therefore, paths of the solvent into the active substance particles are formed, such that all of anions moving in the oxidation-reduction reactions can smoothly move between the interior and the exterior of the active substance particles at charging and discharging. It is thus considered that a high capacity retention rate is obtained, whereby an electricity storage device having excellent cyclic characteristics can be realized.

On the other hand, polymer compound 11 used in Comparative Example 13 do not have any units that lack oxidation-reduction reaction sites as their side chains, and presumably, anions cannot move smoothly. It is thus considered that, through repetitions of charging and discharging, anions which cannot adequately move are accumulated in the neighborhood of polymer compound 11, so that the oxidation-reduction reactions of polymer compound 11 are unable to adequately progress, thus lowering the charge capacity.

Next, output characteristics of the electricity storage devices of Examples 13 and 14 and Comparative Example 12 were evaluated. The output characteristics evaluation of each electricity storage device was made based on a value obtained by dividing a charge-discharge capacity through 10 mA charging and discharging by a charge-discharge capacity through 0.1 mA charging and discharging. The charging and discharging conditions were such that the positive electrode potential had an upper limit voltage of 4.0 V and a lower limit voltage of 3.0 V. As the positive electrode potential, a potential of the positive electrode relative to the reference electrode was used. The downtime after finishing charging or discharging and before beginning discharging or charging was zero.

The charge-discharge capacities of Examples 13 and 14 and Comparative Example 13 through 0.1 mA charging and discharging or through 10 mA charging and discharging are comprehensively shown in Table 5.

TABLE 5

| | positive-electrode active substance | charge-discharge capacity [mAh/g] | | capacity retention rate [%] |
|---|---|---|---|---|
| | | 0.1 mA | 10 mA | |
| Example 13 | copolymer compound B (m/n = 1) | 103 | 74 | 71.4 |
| Example 14 | copolymer compound C (m/n = 5) | 60 | 58 | 96.4 |
| Comparative Example 13 | polymer compound 14 | 132 | 73 | 55.1 |

As shown in Table 5, in the electricity storage device of Example 13, a 71% capacity of the charge-discharge capacity at 0.1 mA was obtained through 10 mA charging and discharging, and in the electricity storage device of Example 14, a 96% capacity of the charge-discharge capacity at 0.1 mA was obtained through 10 mA charging and discharging. On the other hand, in the electricity storage device of Comparative Example 12, only a 55% capacity of the charge-discharge capacity at 0.1 mA was obtained through 10 mA charging and discharging.

In copolymer compound B used in Example 13, although there is a distance between tetrathiafulvalenes for the solvent to permeate, the distance is small, and thus it is considered that the mobility of tetrathiafulvalene within the active substance is not sufficient. Thus, presumably, there were portions where anions could not move smoothly at 10 mA charging and discharging and could not follow the oxidation-reduction reactions, thereby resulting in the decrease from the 0.1 mA charging and discharging. On the other hand, in copolymer compound C used in Example 14, there are interspaces between tetrathiafulvalenes, which are the oxidation-reduction sites, for the tetrathiafulvalene to be sufficiently solvated within the active substance particles, and thus presumably a state is established which is substantially similar to that when tetrathiafulvalene monomer is present in the solvent. Therefore, there are presumably sufficient spaces for the solvated anions to move around the tetrathiafulvalenes which are the oxidation-reduction sites, such that anions are able to smoothly move even in rapid oxidation-reduction reactions, and thus about the same capacity as that in the 0.1 mA charging and discharging was also obtained in the 10 mA charging and discharging.

Thus, the copolymer compound according to the present invention includes second units having side chains which do not undergo oxidation-reduction reactions, and, when used as an active substance of an electricity storage device, created paths for anions to move within the active substance particles, whereby an electricity storage device having a high output power and having little capacity deterioration from charging and discharging was obtained.

As described above, the copolymer compound according to the present invention includes second units lacking oxidation-reduction sites, and, when used in an electricity storage device, creates paths for anions to move within the active substance particles, thus being an electricity storage material which has a high capacity, a high output power, and excellent cyclic characteristics. Moreover, by using the copolymer compound according to the present invention for an electrode active substance, there is provided an electricity storage device which has a high capacity, a high output power, and excellent cyclic characteristics.

INDUSTRIAL APPLICABILITY

The electricity storage material according to the present invention has a light weight, and is unlikely to dissolve in organic solvents, and thus is able to stably undergo reversible oxidation-reduction reactions with a high energy density. Moreover, an electricity storage device is provided that is capable of performing charging and discharging in accordance with the design capacity regardless of the relative dielectric constant of the solvent which is used for an electrolyte solution. Thus, an electricity storage device conforming to the desired characteristics is realized. Such an electricity storage device has a high output power, a high capacity, and excellent cyclic characteristics, and therefore is suitably used for various portable devices, transportation apparatuses, uninterruptible power supplies, and the like. Moreover, it is suitably used for various electrochemical elements such as biochips.

REFERENCE SIGNS LIST 21 coin-type case
22 positive current collector
23 positive-electrode active substance layer
24 separator
25 sealing plate
26 negative-electrode active substance layer
27 negative current collector
28 gasket
29 electrolyte solution
31 positive electrode
32 negative electrode
41 positive-electrode active substance particles
42 electrical conductivity agent section
51 positive electrode lead
52 negative electrode lead
53 reference electrode layer
54 reference current collector
55 reference electrode
56 reference electrode lead
57 aluminum laminate case

The invention claimed is:
1. An electricity storage device comprising:
a positive electrode;
a negative electrode; and
an electrolyte solution interposed between the positive electrode and the negative electrode, wherein:
at least one of the positive electrode and the negative electrode includes:
an electrically conductive support; and
an electricity storage layer provided on the electrically conductive support, the electricity storage layer including an electricity storage material,
the electricity storage material contains a copolymer compound of first units and second units, each first unit having a side chain which includes an oxidation-reduction site having a π conjugate electron cloud and being of a structure represented by general formula (1') below, and each second unit having no oxidation-reduction reaction site as a side chain,
the electricity storage material reversibly undergoes redox reaction, and
in general formula (1'), $X_1$ to $X_4$ are, independently, a sulfur atom, an oxygen atom, a selenium atom, or a tellurium atom; a selected one among Ra to Rd is a bonding hand for binding to another portion which is a main chain or a side chain of the copolymer compound, and the other three of Ra to Rd are, independently, an acyclic aliphatic group, a cyclic aliphatic group, a hydrogen atom, a hydroxyl group, a cyano group, an amino group, a nitro group, a nitroso group, or an alkylthio group:

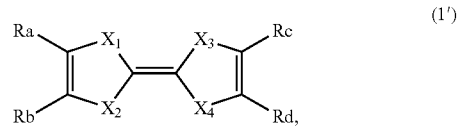

(1')

the second unit includes a side chain which is a functional group having affinity with a nonaqueous solvent,
the second unit includes a side chain which is at least one kind selected from the group consisting of an ester group, an ether group, a carbonyl group, a cyano group, a nitro group, a nitroxyl group, an alkyl group, a phenyl group, an alkylthio group, a sulfone group, and a sulfoxide group,
the copolymer compound has a structure represented by general formula (4) below, in general formula (4), $R_9$ and $R_{10}$ constitute a main chain of the copolymer compound, and $R_9$ and $R_{10}$ are trivalent residues containing, independently: at least one selected from the group consisting of a carbon atom, an oxygen atom, a nitrogen atom, and a sulfur atom; and at least one substituent selected from the group consisting of saturated aliphatic groups and unsaturated aliphatic groups having a carbon number from 1 to 10 or at least one hydrogen atom, $L_1$ is an ester group, an ether group, a carbonyl group, a cyano group, a nitro group, a nitroxyl group, an alkyl group, a phenyl group, an alkylthio group, a sulfone group, or a sulfoxide group that is bound to $R_9$, $R_{12}$ is a divalent residue including at least one selected from the group consisting of a substituted or unsubstituted alkylene, alkenylene, arylene, ester, amide, and ether having a carbon number from 1 to 4 that are bound to $R_{10}$ and $M_1$, $M_1$ is general formula (1'), and is bound to $R_{12}$ via the bonding hand, and a constituent ratio m/n of a number n of first units composing the copolymer compound and a number m of second units is greater than 0 and equal to or less than 5, where n and m are integers:

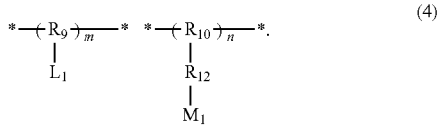

(4)

2. The electricity storage device of claim 1, wherein:
the copolymer compound is represented by formula (5) below, and
in general formula (5), $R_{12}$ is a divalent residue including at least one selected from the group consisting of a substituted or unsubstituted alkylene, alkenylene, arylene, ester, amide, and ether having a carbon number from 1 to 4; $R_{13}$ and $R_{14}$ are, independently, one selected from the group consisting of a saturated aliphatic group having a carbon number of 1 to 4 and a phenyl group, or a hydrogen atom; $R_{15}$ to $R_{17}$ are, independently, an acyclic aliphatic group, a cyclic aliphatic group, a hydrogen atom, a hydroxyl group, a cyano group, an amino group, a nitro group, a nitroso group, or an alkylthio group;

$L_1$ is an ester group, an ether group, a carbonyl group, a cyano group, a nitro group, a nitroxyl group, an alkyl group, a phenyl group, an alkylthio group, a sulfone group, or a sulfoxide group; and n and m are integers representing a number of times of repeating monomer units:

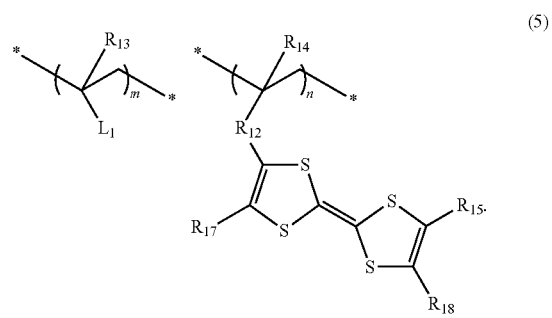

(5)

3. The electricity storage device of claim 2, wherein $L_1$ includes at least one kind selected from the group consisting of an ester group, an ether group, and a carbonyl group.

4. The electricity storage device of claim 3, wherein the copolymer compound has a structure represented by formula (6) below, and in formula (6), n and m are integers representing a number of times of repeating monomer units:

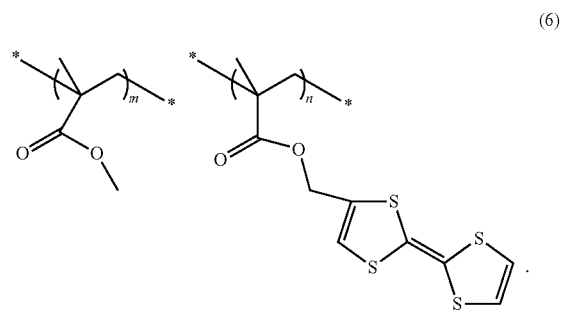

(6)

5. The electricity storage device of claim 1, wherein the electricity storage layer contains an electrically conductive substance.

6. The electricity storage device of claim 5, wherein the electrolyte solution contains a salt of quaternary ammonium cations and anions.

7. A portable electronic device comprising the electricity storage device of claim 6.

8. A vehicle comprising the electricity storage device of claim 6.

9. The electricity storage device of claim 1, wherein degree of polymerization of the copolymer is no less than 20 and no more than 4000.

* * * * *